(12) United States Patent
Yamaguchi

(10) Patent No.: US 8,305,732 B2
(45) Date of Patent: Nov. 6, 2012

(54) DIELECTRIC CERAMIC AND CAPACITOR

(75) Inventor: Katsuyoshi Yamaguchi, Kagoshima (JP)

(73) Assignee: Kyocera Corporation, Kyoto (JP)

( * ) Notice: Subject to any disclaimer, the term of this patent is extended or adjusted under 35 U.S.C. 154(b) by 150 days.

(21) Appl. No.: 12/996,379

(22) PCT Filed: Mar. 27, 2009

(86) PCT No.: PCT/JP2009/056297
§ 371 (c)(1),
(2), (4) Date: Dec. 3, 2010

(87) PCT Pub. No.: WO2009/147893
PCT Pub. Date: Dec. 10, 2009

(65) Prior Publication Data
US 2011/0085281 A1    Apr. 14, 2011

(30) Foreign Application Priority Data
Jun. 4, 2008   (JP) .................. 2008-146533

(51) Int. Cl.
*H01G 4/06* (2006.01)
*C04B 35/00* (2006.01)

(52) U.S. Cl. ............... 361/321.4; 361/321.1; 361/321.2; 361/321.3; 501/137; 501/138; 501/139

(58) Field of Classification Search .... 361/321.1–321.4; 501/137–139
See application file for complete search history.

(56) References Cited

U.S. PATENT DOCUMENTS
2003/0158032 A1   8/2003   Fujikawa et al.

FOREIGN PATENT DOCUMENTS
| | | |
|---|---|---|
| JP | 6012917 A | 1/1994 |
| JP | 2001-031467 A | 2/2001 |
| JP | 2001-089231 A | 4/2001 |
| JP | 2003192432 A | 7/2003 |
| JP | 2006137633 A | 6/2006 |
| JP | 2001-294481 A | 10/2009 |

*Primary Examiner* — Eric Thomas
*Assistant Examiner* — Arun Ramaswamy
(74) *Attorney, Agent, or Firm* — Birch, Stewart, Kolasch & Birch, LLP

(57) ABSTRACT

Disclosed is a dielectric ceramic having crystal grains mainly composed of barium titanate and an intergranular phase formed among the crystal grains. The dielectric ceramic contains certain amounts of manganese and at least one rare earth element (RE) selected from magnesium, gadolinium, terbium, dysprosium, holmium and erbium, in terms of oxides, per 1 mole of barium constituting the barium titanate. The dielectric ceramic also contains a certain amount of yttrium in terms of oxides, per 100 parts by mass of the barium titanate. The crystal grains have an average grain size of 0.05-0.2 μm. By using the dielectric ceramic as a dielectric layer, there can be obtained a capacitor having high capacity and stable capacitance temperature characteristics.

4 Claims, 2 Drawing Sheets

DIELECTRIC CERAMIC AND CAPACITOR

This application is the national stage of International Application No. PCT/JP2009/056297 filed on Mar. 27, 2009, which claims priority under 35 USC §119 (a)-(d) of Application No. 2008-146533 filed in Japan on Jun. 4, 2008.

TECHNICAL FIELD

This present invention relates to dielectric ceramics constituted by crystal grains containing barium titanate as a main component, and a capacitor using the same as a dielectric layer.

BACKGROUND ART

Digital electronic devices such as mobile computers and cellular phones are now widely used. Nationwide digital terrestrial broadcasting will start in near future. Receivers for digital terrestrial broadcasting comprise digital electronic devices such as a liquid crystal display and a plasma display. Such digital electronic devices include many LSI's.

Power circuits constituting digital electronic devices such as a liquid crystal display and a plasma display include many capacitors for bypassing. A multilayer ceramic capacitor used for those devices having a high relative dielectric constant (for example, see the Patent Document 1) is used if a high capacitance is required. On the other hand, a temperature-compensating type multilayer ceramic capacitor having a low change rate of capacitance (for example, see the Patent Document 2) is used if a temperature characteristic of a capacitance is important even though the dielectric constant is low.

However, a multilayer ceramic capacitor having a high relative dielectric constant disclosed in the Patent Document 1, however, is constituted by dielectric crystals of dielectric ceramics in which dielectric layers have a ferroelectric property. Therefore, in the multilayer ceramic capacitor, a temperature change rate of the relative dielectric constant of dielectric ceramics is high, and hysteresis in electric-field versus dielectric polarization characteristic is high, which are bothersome.

In addition, in capacitors using dielectric ceramics, in which dielectric layers have a ferroelectric property disclosed in Patent Document 1, audible noise sounds tend to be easily generated on a power supply circuit due to an electrically induced strain. This is an obstacle for using such capacitors in plasma displays and the like.

On the other hand, in a temperature-compensating type multilayer ceramic capacitor, since the dielectric ceramic constituting the capacitor has a paraelectric property, the hysteresis in electric-field versus dielectric polarization characteristic is low. Thereby, the temperature-compensating type multilayer ceramic capacitor is advantageously free from the electrically induced strain inherent to the ferroelectric property. However, since the temperature-compensating type multilayer ceramic capacitor has a low relative dielectric constant, its accumulating capability is low and performances as a bypass capacitor are unsatisfied. It is a problem.

[Patent Document 1] Japanese Unexamined Patent Application Publication No. 2001-89231

[Patent Document 2] Japanese Unexamined Patent Application Publication No. 2001-294481

DISCLOSURE OF INVENTION

Problems to be Solved by the Invention

An object of the present invention is to provide a dielectric ceramic which has a high relative dielectric constant and stable temperature characteristics of relative dielectric constant, and a capacitor using the same.

A dielectric ceramic according to the present invention comprises crystal grains containing barium titanate as a main component; and a grain boundary phase formed between or among the crystal grains. With respect to one mole of barium constituting the barium titanate, the dielectric ceramic contains: magnesium equivalent to 0.01 to 0.06 mole of MgO; rare earth element (RE) equivalent to 0.0007 to 0.03 mole of $REO_{3/2}$ where rare earth element comprises at least one element selected from gadolinium, terbium, dysprosium, holmium and erbium; and manganese equivalent to 0.0002 to 0.03 mole of MnO. With respect to 100 parts by mass of barium titanate, the dielectric ceramic further contains ytterbium equivalent to 3.6 to 52.1 parts by mass of $Yb_2O_3$. The average grain size of the crystal grains is 0.05 μm to 0.2 μm.

In the dielectric ceramic according to the present invention, with respect to one mole of barium, the dielectric ceramic preferably contains: magnesium equivalent to 0.017 to 0.023 mole of MgO; the rare earth element(RE) equivalent to 0.0015 to 0.01 mole of $REO_{3/2}$; and manganese equivalent to 0.01 to 0.013 mole of MnO. The dielectric ceramic further contains ytterbium equivalent to 6.3 to 15.6 parts by mass of $Yb_2O_3$ with respect to 100 parts by mass of barium titanate. Ratio of titanium to one mole of barium constituting the barium titanate is 0.97 to 0.98.

A capacitor according to the present invention comprises a laminated body which comprises: dielectric layers consisting of the dielectric ceramic; and conductive layers.

RE representing rare earth elements is based on English expression of rare earth elements in the periodic table".

According to the present invention, a dielectric ceramic has a smaller temperature change rate of the relative dielectric constant than existing dielectric ceramics having a ferroelectric property, a higher and more stable relative dielectric constant than existing dielectric ceramics having a paraelectric property, and a low dielectric polarization.

According to the present invention, by applying the dielectric ceramic to a capacitor, the capacitor can have a high relative dielectric constant compared to existing dielectric ceramics, and stable temperature characteristics of the relative dielectric constant. Therefore, if the capacitor is used for a power supply circuit, generation of audible noise sounds due to an electrically induced strain can be prevented.

Figure 1:
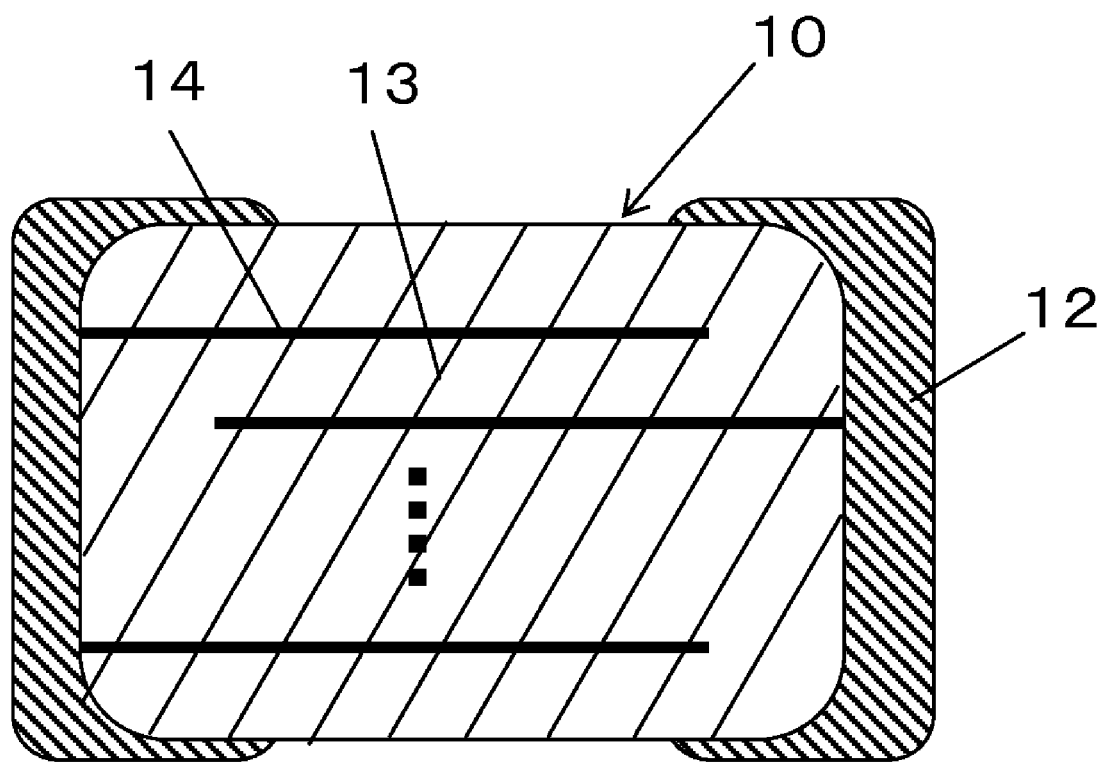
FIG. 1 is a schematic cross-sectional view illustrating an exemplary capacitor according to the present invention.

| REFERENCE NUMERALS |
| --- |
| 10  capacitor body |
| 12  external electrode |
| 13  dielectric layer |
| 14  internal electrode layer |

BEST MODE FOR CARRYING OUT THE INVENTION

A dielectric ceramic according to the present invention comprises barium titanate as a main component, magnesium, at least one rare earth element selected from gadolinium, terbium, dysprosium, holmium and erbium, manganese and ytterbium. With respect to one mole of barium, the dielectric ceramic contains magnesium equivalent to 0.01 to 0.06 mole of MgO; rare earth element (RE) equivalent to 0.0007 to 0.03 mole of $REO_{3/2}$; and manganese equivalent to 0.0002 to 0.03 mole of MnO. With respect to 100 parts by mass of barium titanate, the dielectric ceramic further contains ytterbium equivalent to 3.6 to 52.1 parts by mass of $Yb_2O_3$.

In the dielectric ceramic according to the present invention, the average grain size of the crystal grains constituting the dielectric ceramic is 0.05 μm to 0.2 μm.

If the dielectric ceramic comprises the above-mentioned compositions and a grain size in the above-mentioned range, a relative dielectric constant, which is described later, at room temperature (25° C.) is 180 or more, a relative dielectric constant at 125° C. is 160 or more, and a temperature coefficient $((\in125-\in25)/\in25(125-25))$ of relative dielectric constant in a temperature range of 25° C. to 125° C. is $1000\times10^{-6}/°$ C. or less in its absolute value. The dielectric ceramic can also have a small hysteresis in electric-field versus dielectric polarization characteristic.

In the dielectric ceramic according to the present invention, the barium titanate comprises a solid solution of magnesium, the at least one rare earth element (RE), manganese and ytterbium. By setting the average grain size of the crystal grains comprising the barium titanate as a main component with such solid solution in a range of 0.05 to 0.2 μm, the crystal grains are allowed to have a crystal structure mainly comprising a cubic system. As a result, the ferroelectric property due to the crystal structure of the tetragonal crystals is lowered, and the paraelectric property is consequently enhanced, and spontaneous polarization is reduced because of the enhanced paraelectric property.

By setting crystal structure of the crystal grains comprising barium titanate as a main component to the cubic system, a constant rate of change in relative dielectric constant in a temperature range of −55° C. to 125° C. is flat. Consequently, the hysteresis in the electric-field versus dielectric polarization characteristic is small. For this reason, even if the relative dielectric constant can be 180 or more, a dielectric ceramic having a low temperature coefficient of relative dielectric constant can be obtained.

In other words, when the magnesium, the manganese, the at least one rare earth element (RE) and manganese are contained in the barium titanate in a particular range, the dielectric ceramic can have a Curie temperature of 25° C. or more and have a positive value in its temperature coefficient in the relative dielectric constant. In addition, when the ytterbium is further added to the dielectric ceramic having such a dielectric property, more significant advantages can be obtained; the temperature coefficient of the relative dielectric constant can be smaller and the temperature characteristic can be further flattened. In this case, a curve of the rate of change in the relative dielectric constant may have two peaks, centered at 25° C. in the temperature range from −55° C. to 125° C. One peak may appear between −55° C. and 25° C. and the other peak may appear between 25° C. and 125° C.

The ytterbium may prevent the crystal grains containing barium titanate as a main component from having significant grain growth. The ytterbium included is equivalent to 3.6 to 52.1 parts by mass of $Yb_2O_3$ with respect to 100 parts by mass of barium titanate.

If the ytterbium is equivalent to less than 3.6 parts by mass of $Yb_2O_3$ with respect to 100 parts by mass of the barium titanate, the dielectric ceramic has a high relative dielectric constant, but has a high temperature coefficient in the relative dielectric constant. In contrast, if the ytterbium is equivalent to more than 52.1 parts by mass of $Yb_2O_3$ with respect to 100 parts by mass of the barium titanate, the relative dielectric constant at 25° C. may be lower than 180, and the relative dielectric constant at 125° C. is less than 160.

In addition, the dielectric ceramic according to the present invention, with respect to 100 parts by mass of barium, comprises magnesium equivalent to 0.01 to 0.06 mole of MgO; at least one rare earth element (RE) selected from gadolinium, terbium, dysprosium, holmium and erbium equivalent to 0.0007 to 0.03 mole of $REO_{3/2}$; and manganese equivalent to 0.0002 to 0.03 mole of MnO.

That is, if the magnesium is equivalent to less than 0.01 mole of MgO with respect to one mole of the barium, or if the magnesium is equivalent to more than 0.06 mole of MgO with respect to one mole of the barium, the dielectric ceramic has a high temperature coefficient in the relative dielectric constant. If the at least one rare earth element (RE) is equivalent to less than 0.0007 mole of $RE_2O_3$ with respect to one mole of the barium, or if the at least one rare earth element (RE) is equivalent to more than 0.03 mole of $RE_2O_3$ with respect to one mole of the barium, the dielectric ceramic has a high relative dielectric constant, but has a high temperature coefficient in the relative dielectric constant. Furthermore, if the manganese is equivalent to less than 0.0002 mole of MnO with respect to one mole of the barium, or if the manganese is equivalent to more than 0.03 mole of MnO with respect to one mole of the barium, the dielectric ceramic has a high temperature coefficient in the relative dielectric constant.

At least one rare earth element (RE) selected from holmium and erbium preferably achieve 250 or more of the relative dielectric constant at room temperature (25° C.) and increase dielectric constant.

The average grain size of the crystal grains in the dielectric ceramic is 0.05 to 0.2 μm, according to the present embodiment.

That is, if the average grain size of the crystal grains comprising the barium titanate as a main component is in a range of 0.05 to 0.2 μm, the crystal grains comprising the barium titanate as a main component are allowed to have a crystal structure mainly comprising the cubic system, and the hysteresis in electric-field versus dielectric polarization characteristic can be small so as to exhibit substantially a paraelectric property.

In contrast, if the average grain size of the crystal grains comprising the barium titanate as a main component is smaller than 0.05 μm, since no effect of oriented polarization is exerted, the relative dielectric constant of the dielectric ceramic is low. In addition, if the average grain size of the crystal grains is greater than 0.2 μm, a crystal phase of a tetragonal system can be observed by X-ray diffraction, and the dielectric ceramic has a high temperature coefficient in relative dielectric constant.

The crystal structure mainly comprising the cubic system refers to a structure in which the intensity of an X-ray diffraction peak on the (110) plane that is the strongest peak in barium titanate of the cubic system is greater than the intensity of an X-ray diffraction peak of the different phase.

A preferable content of the above-mentioned components in the dielectric ceramic is as follows: with respect to one mole of the barium, the magnesium is equivalent to 0.017 to 0.023 mole of MgO, the at least one rare earth element (RE) is equivalent to 0.0015 to 0.01 mole of $REO_{3/2}$, and the manganese is equivalent to 0.01 to 0.013 mole of MnO. Preferably, the ytterbium is equivalent to 6.3 to 15.6 parts by mass with respect to 100 parts by mass of the barium titanate and the ratio of titanium with respect to one mole of barium is 0.97 to 0.98. Furthermore, the average grain size of the crystal grains is preferably between 0.14 and 0.18 μm.

The dielectric ceramic with the above composition and grain size can have the relative dielectric constant of 420 or more at 25° C. and 400 or more at 125°, the temperature coefficient in the relative dielectric constant of $570 \times 10^{-6}$/° C. or less in the absolute value, and the dielectric charge indicating the hysteresis of the dielectric polarization at 0V of 40 $nC/cm^2$ or less.

Here, the average grain size of the crystal grains comprising barium titanate as a main component can be obtained as is described below. First, fractured surfaces of sintered dielectric ceramic samples are polished, and then photograph of the microstructure is taken with using of a scanning electron microscope. A circle is drawn on the photograph so as to containing 50 to 100 crystal grains in the circle. Crystal grains on or in the circle are selected and profiles of the crystal grains are image-processed, and an area of each grain is measured. Area of each crystal grain was measured. The diameter of a circle that has the same area thereof is calculated. The average value thereof is calculated.

The relative dielectric constant at 25° C. and 125° C., as described below, is determined as follows. A capacitance under a condition of a temperature of 25° C., a frequency of 1.0 kHz and an input signal level of 1.0V with LCR meter 4284A is measured for a dielectric ceramic sample which is formed into predetermined pellet shape and on which a conductive layer is formed. The relative dielectric constant is calculated with using the diameter and thickness of the sample having a pellet shape, and area of the conductive layer.

The temperature coefficient of the relative dielectric constant between 25° C. to 125° C. can be calculated by applying the relative constants at 25° C. and 125° C. to an equation of $((\in_{125} - \in_{25})/\in_{25}(125-25))$ where $\in_{25}$ is the relative dielectric constant at 25° C. and $\in_{125}$ is the relative dielectric constant at 125° C.

A method according to an embodiment for producing a dielectric ceramic is discussed below.

First, $BaCO_3$ powder, $TiO_2$ powder, MgO powder, at least one rare earth (RE) oxide powder selected from $Gd_2O_3$ powder, $Tb_2O_3$ powder, $Dy_2O_3$ powder, $Ho_2O_3$ powder and $Er_2O_3$ powder, and manganese carbonate ($MnCO_3$) powder, each having a purity of 99% or more, are used as a raw materials. These powders are respectively blended so as to contain ratios of 0.01 to 0.06 mole of MgO per 1 mole of barium included in the dielectric ceramic, 0.0007 to 0.03 mole of at least one rare earth (RE) oxide ($RE_2O_3$) selected from $Gd_2O_3$, $Tb_2O_3$, $Dy_2O_3$, $Ho_2O_3$ powder and $Er_2O_3$ per 1 mole of barium included in the dielectric ceramic, and 0.0002 to 0.03 mole of $MnCO_3$ per 1 mole of barium included in the dielectric ceramic.

Then, the mixture of the above-mentioned powders is wet-mixtured, and after having been dried, it is calcined at a temperature in a range of 900 to 1100° C. to produce calcined powder, and then the calcined powder is pulverized. Making grain growth such that the crystal structure of the calcined powder becomes mainly a cubic system can allow the dielectric ceramic to have a high dielectric constant while maintaining a temperature characteristic in the relative dielectric constant close to the paraelectric property.

The average particle size of the calcined powder is preferably in a range of 0.04 to 0.1 μm to prevent the calcined powder from having ferroelectric property. The average particle size of the calcined powder is described as follows. The calcined powder is scattered on the sample stage of a scanning electron microscope, photograph of the particles is taken with using of a scanning electron microscope. A circle is drawn on the photograph so as to containing 50 to 100 particles in the circle. Particles on or in the circle are selected and profiles of the particles are image-processed. Area of each particle was measured. The diameter of a circle that has the same area thereof is calculated. Then, an average value thereof is calculated.

Thereafter, 3.5 to 50 parts by mass of $Yb_2O_3$ powder with respect to 100 parts by mass of the calcined powder is added and mixed. Then, resultant mixed powder is molded into pellets, and the pellets are sintered at a temperature in a range of 1300° C. to 1400° C. in $H_2$—$N_2$ to obtain the dielectric ceramics according to the present invention. The sintering may be carried out in the atmosphere or in a reducing atmosphere. If the sintering temperature is lower than 1300° C., the density of the dielectric ceramic is low due to a lack of grain growth and densification of the crystal grains. In contrast, if the sintering temperature is higher than 1400° C., the crystal grains of the dielectric ceramic may have excessive unnecessary grain growth.

FIG. 1 is a schematic cross-sectional view illustrating an exemplary capacitor according to the present invention. Using the dielectric ceramic according to the present invention, the following capacitor can be obtained.

As shown FIG. 1, in the capacitor according to the present invention, external electrodes 12 are formed on the both ends of the capacitor main body 10. The capacitor main body 10 consists of a laminated body in which a plurality of dielectric layers 13 and a plurality of conductor layers 14 serving as inner electrode layers are alternately laminated. The dielectric layers 13 are made of the dielectric ceramic according to the above-mentioned present invention. In other words, the capacitor can have a higher capacity and more stable capacity temperature characteristic than an existing capacitor by using the dielectric ceramic as the dielectric layers 13. This is, because the dielectric ceramic having a high dielectric constant, a stable temperature characteristic in the relative dielectric constant, and a small spontaneous polarization is used as the dielectric layer 13, the capacitor can have a higher capacitance and stable temperature characteristic in the capacitance than existing capacitors. Therefore, the capacitor can reduce an audible noise sound caused by an electrically induced strain in a power supply circuit.

Each of the dielectric layers 13 preferably has the thickness of 1 to 30 μm. If the thickness of the dielectric layers 13 is less than 5 μm, the thinning of the dielectric layers 13 causes an increase in the electrostatic capacity of the capacitor.

The conductor layer 14 is preferably made of base metals, such as Ni and Cu in order to reduce the manufacturing cost. In particular, the conductor layer 14 is preferably made of Ni to carry easily out a simultaneous sintering with the dielectric layer 13. An average thickness of the conductor layer 14 is preferably 1 µm or less.

The aforementioned mixed powder is molded onto a green sheet to manufacture such a capacitor. A conductive paste for forming the conductor layer 14 is prepared and then applied on the surface of the green sheet. The resultant sheets are laminated, and then sintered to form the laminated body 1. Thereafter, the conductor paste is further applied to the two end faces of the laminated body 1 for forming external electrodes 12, and the resultant laminated body is sintered to obtain a capacitor of the present embodiment.

EXAMPLES

Embodiments of the invention are further explained in detail in the context of the following examples below. However, the invention is not limited to the following examples.

Example 1

Evaluation samples were prepared as follows. First, $BaCO_3$ powder, $TiO_2$ powder, MgO powder, $Gd_2O_3$ powder and $MnCO_3$ powder, each having a purity of 99.9%, were provided and were blended at ratios shown in Tables 1 to prepare mixed powder. The amounts of the magnesium (Mg), the gadolinium (Gd) and the manganese (Mn) shown in Table 1 are equivalent to the amounts of MgO, $Y_2O_3$ and MnO with respect to 1 mole of Ba respectively. The yttrium content was indicated by the molar ratio of the $Y_2O_3$ to the barium. The titanium (Ti) is a molar ratio to 1 mole of the barium (Ba).

Next, the mixed powder prepared was calcined at 1000° C. to obtain calcined powder, and the resultant calcined powder was pulverized to obtain calcined and pulverized powder having average particle size shown in Table 1. The average particle size of the calcined and pulverized powder was measured by the following processes: the particles of the calcined and pulverized powder was scattered on the sample stage of a scanning electron microscope, a photograph of the particles were taken with using of a scanning electron microscope, profiles of the particles on the photograph were image-processed. A circle is drawn on the photograph so as to containing 50 to 100 particles in the circle. Particles on or in the circle are selected and profiles of the particles are image-processed. Area of each particles was measured. The diameter of a circle that has the same area thereof is calculated. Then, an average value thereof is calculated.

Thereafter, the $Yb_2O_3$ powder having a purity of 99.9% was mixed with 100 parts by weight of the calcined powder at a ratio shown in Table 1. The mixed powder was granulated, and molded into pellets having a diameter of 16.5 mm and a thickness of 1 mm.

Then, ten pieces of pellets for each composition were sintered in $H_2$—$N_2$ at a temperature shown in Table 1 to obtain samples of the dielectric ceramic. The average grain size of crystal grains of the dielectric ceramic comprising the barium titanate as a main component was measured in the following processes. First, the fractured surface of a sintered sample was roughly polished with a polishing paper of #1200, and was then subjected to a polishing process by using a diamond paste having a particle size of 3 µm applied on a hard buff, and this was further subjected to a finish polishing process by using a soft buff with alumina abrasive particles applied thereon and having a particle size of 0.3 µm. Next, the resultant fractured surface was etched by an acidic aqueous solution (hydrochloric acid-hydrogen fluoride), and the inner microstructure thereof was then photographed with a scanning electron microscope. Then, a circle is drawn on the photograph so as to containing 50 to 100 crystal grains therein. The crystal grains on or in the circle were selected and profiles of the crystal grains are image-processed. Area of each crystal grain was measured. The diameter of the circle that has the same area thereof is calculated. Then, an average value thereof is calculated.

An indium-gallium conductive layer was printed on the surface of the sintered sample to form an evaluation sample for evaluating dielectric properties (Samples Nos. 1-1 to 1-35 in Table 2).

The relative dielectric constant of the resultant dielectric ceramic samples was measured in the following processes. The electrostatic capacity of each of samples was measured by LCR meter 4284A under conditions of a frequency of 1.0 kHz, an input signal level of 1.0V, and temperatures of 25° C. and 125° C. Then, the relative dielectric constants at 25° C. and 125° C. were calculated based upon the diameter and thickness of the sample, and the area of the conductor layer. The temperature coefficient of the relative dielectric constant were calculated by applying the relative constants at 25° C. and 125° C. to an equation of $((\in_{125}-\in_{25})/\in_{25}(125-25))$ where $\in_{25}$ is the relative dielectric constant at 25° C. and $\in_{125}$ is the relative dielectric constant at 125° C. These measurements were carried out by setting the number of samples to 10 and calculating the average value thereof.

Then, electrically induced strain was measured by a dielectric polarization (polarization charge) measurement for the resultant samples. In this case, the measurement was made based upon the quantity of charge (residual polarization) at 0V when the voltage is changed within a range of ±1250V.

The compositions of the samples were determined by using Inductively Coupled Plasma (ICP) emission spectroscopy and atomic absorption spectroscopy. In this case, a mixture of each resultant dielectric ceramic, boric acid and sodium carbonate was melted and dissolved in hydrochloric acid, and the resultant solution was qualitatively analyzed by atomic absorption spectroscopy for identifying elements contained in the samples. Then, the identified elements were quantified by ICP emission spectroscopy with standard samples obtained by diluting standard solutions of the elements. The oxygen content was measured with the assumption that the elements had valences shown in the periodic table of elements.

Compositions of powder mixtures, average particle sizes of calcined powders, and sintering temperatures are shown in the Tables 1. The average grain sizes of the crystal grains and the characteristics (relative dielectric constant, absolute values of temperature coefficients of relative dielectric constant, temperature change curves in relative dielectric constant and polarized charges) of the sintered samples are shown in Tables 2.

The amounts of the $Yb_2O_3$ additive in the Table 1 corresponds to a mass ratio with respect to 100 parts by mass of calcined powder while the amounts of the $Yb_2O_3$ in Table 2 corresponds to a mass ratio relative to 100 parts by mass of barium titanate in the dielectric ceramic (sample). Amounts of the Mg, the rare earth element (RE) and the Mn in Table 2 correspond to converted amounts based on oxide. "Average grain size of crystal grains" in Table 2 refers to the average grain size of crystal grains of the dielectric ceramic containing the barium titanate as a main component. Moreover, "the absolute value of temperature coefficient in relative dielectric constant" in Table 2 refers to the absolute value of the average value of the temperature coefficients in relative dielectric constant measured as described above.

In the "curve of the rate of change in the relative dielectric constant" column in Table 2, entries marked without "○" represent samples in which two peaks were not found two peaks centered on 25° C., with one between −55 and 25° C. and one between 25° C. and 125° C. In the "polarized charge" column in Table 2, entries without "○" represent samples whose polarization charge is not 40 nC/cm² or less.

TABLE 1

| Sample No. | Ba mole | MgO mole | $GdO_{3/2}$ mole | $MnCO_3$ mole | Ti mole | $Yb_2O_3$ parts by mass | Average Particle Size of Calcinated Powder μm | Sintering Temperature ° C. |
|---|---|---|---|---|---|---|---|---|
| *1-1 | 1 | 0.02 | 0.01 | 0.01 | 0.98 | 2.0 | 0.1 | 1350 |
| 1-2 | 1 | 0.02 | 0.01 | 0.01 | 0.98 | 3.5 | 0.1 | 1350 |
| 1-3 | 1 | 0.02 | 0.01 | 0.01 | 0.98 | 4.0 | 0.1 | 1350 |
| 1-4 | 1 | 0.02 | 0.01 | 0.01 | 0.98 | 6.0 | 0.1 | 1350 |
| 1-5 | 1 | 0.02 | 0.01 | 0.01 | 0.98 | 8.5 | 0.1 | 1350 |
| 1-6 | 1 | 0.02 | 0.01 | 0.01 | 0.98 | 15.0 | 0.1 | 1350 |
| 1-7 | 1 | 0.02 | 0.01 | 0.01 | 0.98 | 20.0 | 0.1 | 1350 |
| 1-8 | 1 | 0.02 | 0.01 | 0.01 | 0.98 | 50.0 | 0.1 | 1350 |
| *1-9 | 1 | 0.02 | 0.01 | 0.01 | 0.98 | 55.0 | 0.1 | 1350 |
| *1-10 | 1 | 0.02 | 0.0002 | 0.01 | 0.98 | 8.5 | 0.1 | 1350 |
| 1-11 | 1 | 0.02 | 0.0007 | 0.01 | 0.98 | 8.5 | 0.1 | 1350 |
| 1-12 | 1 | 0.02 | 0.0015 | 0.01 | 0.98 | 8.5 | 0.1 | 1350 |
| 1-13 | 1 | 0.02 | 0.005 | 0.01 | 0.98 | 8.5 | 0.1 | 1350 |
| 1-14 | 1 | 0.02 | 0.007 | 0.01 | 0.98 | 8.5 | 0.1 | 1350 |
| 1-15 | 1 | 0.02 | 0.03 | 0.01 | 0.98 | 8.5 | 0.1 | 1350 |
| *1-16 | 1 | 0.02 | 0.04 | 0.01 | 0.98 | 8.5 | 0.1 | 1350 |
| *1-17 | 1 | 0.005 | 0.01 | 0.01 | 0.98 | 8.5 | 0.1 | 1350 |
| 1-18 | 1 | 0.01 | 0.01 | 0.01 | 0.98 | 8.5 | 0.1 | 1350 |
| 1-19 | 1 | 0.017 | 0.01 | 0.01 | 0.98 | 8.5 | 0.1 | 1350 |
| 1-20 | 1 | 0.023 | 0.01 | 0.01 | 0.98 | 8.5 | 0.1 | 1350 |
| 1-21 | 1 | 0.06 | 0.01 | 0.01 | 0.98 | 8.5 | 0.1 | 1350 |
| *1-22 | 1 | 0.07 | 0.01 | 0.01 | 0.98 | 8.5 | 0.1 | 1350 |
| 1-23 | 1 | 0.02 | 0.01 | 0.005 | 0.98 | 8.5 | 0.1 | 1350 |
| 1-24 | 1 | 0.02 | 0.01 | 0.008 | 0.98 | 8.5 | 0.1 | 1350 |
| 1-25 | 1 | 0.02 | 0.01 | 0.013 | 0.98 | 8.5 | 0.1 | 1350 |
| 1-26 | 1 | 0.02 | 0.01 | 0.015 | 0.98 | 8.5 | 0.1 | 1350 |
| 1-27 | 1 | 0.02 | 0.01 | 0.03 | 0.98 | 8.5 | 0.1 | 1350 |
| *1-28 | 1 | 0.02 | 0.01 | 0.04 | 0.98 | 8.5 | 0.1 | 1350 |
| 1-29 | 1 | 0.02 | 0.01 | 0.01 | 0.97 | 8.5 | 0.1 | 1350 |
| 1-30 | 1 | 0.02 | 0.01 | 0.01 | 0.99 | 8.5 | 0.1 | 1350 |
| *1-31 | 1 | 0.02 | 0.01 | 0 | 0.98 | 8.5 | 0.1 | 1350 |
| 1-32 | 1 | 0.02 | 0.03 | 0.01 | 0.98 | 8.5 | 0.04 | 1350 |
| *1-33 | 1 | 0.02 | 0.03 | 0.01 | 0.98 | 8.5 | 0.04 | 1320 |
| *1-34 | 1 | 0.02 | 0.01 | 0.01 | 0.98 | 8.5 | 0.1 | 1380 |
| 1-35 | 1 | 0.02 | 0.01 | 0.0002 | 0.98 | 8.5 | 0.1 | 1350 |

*Asterisked samples do not fall within the scope of the present invention.

TABLE 2

| Sample No. | Composition | | | | | | Average Crystal Grain Size μm | Relative Dielectric Constant (εr) | | Maximum Absolute Value of Temperature Coefficient of εr | Temperature Dependence Curve of εr | Poralized Charge |
|---|---|---|---|---|---|---|---|---|---|---|---|---|
| | Ba mole | MgO mole | $GdO_{3/2}$ mole | MnO mole | Ti mole | $Yb_2O_3$ parts by mass | | 25° C. | 125° C. | 25 to 125° C. $\times 10^{-6}/°$ C. | ○: Two Peaks observed | ○: 20 nC/cm² or less |
| *1-1 | 1 | 0.02 | 0.01 | 0.01 | 0.98 | 2.1 | 0.40 | 2394 | 1404 | 4135 | | |
| 1-2 | 1 | 0.02 | 0.01 | 0.01 | 0.98 | 3.6 | 0.20 | 998 | 901 | 963 | ○ | |
| 1-3 | 1 | 0.02 | 0.01 | 0.01 | 0.98 | 4.2 | 0.18 | 779 | 705 | 953 | ○ | |
| 1-4 | 1 | 0.02 | 0.01 | 0.01 | 0.98 | 6.3 | 0.17 | 646 | 622 | 369 | ○ | ○ |
| 1-5 | 1 | 0.02 | 0.01 | 0.01 | 0.98 | 8.9 | 0.15 | 618 | 593 | 402 | ○ | ○ |
| 1-6 | 1 | 0.02 | 0.01 | 0.01 | 0.98 | 15.6 | 0.15 | 599 | 573 | 430 | ○ | ○ |
| 1-7 | 1 | 0.02 | 0.01 | 0.01 | 0.98 | 20.8 | 0.15 | 589 | 549 | 679 | ○ | |
| 1-8 | 1 | 0.02 | 0.01 | 0.01 | 0.98 | 52.1 | 0.15 | 239 | 217 | 957 | ○ | |
| *1-9 | 1 | 0.02 | 0.01 | 0.01 | 0.98 | 57.3 | 0.15 | 171 | 153 | 1061 | | |
| *1-10 | 1 | 0.02 | 0.0002 | 0.01 | 0.98 | 8.8 | 0.40 | 760 | 644 | 1526 | | |
| 1-11 | 1 | 0.02 | 0.0007 | 0.01 | 0.98 | 8.8 | 0.20 | 684 | 625 | 863 | ○ | |

TABLE 2-continued

| Sample No. | Composition | | | | | Avarage Crystal Grain Size μm | Relative Dielectric Constant (εr) | | Maximum Abusolute Value of Temperature Coefficient of εr | Temperature Dependence Curve of εr | Poralized Charge |
|---|---|---|---|---|---|---|---|---|---|---|---|
| | Ba mole | MgO mole | GdO$_{3/2}$ mole | MnO mole | Ti mole | Yb$_2$O$_3$ parts by mass | 25° C. | 125° C. | 25 to 125° C. ×10$^{-6}$/° C. | ○: Two Peaks observed | ○: 20 nC/cm$^2$ or less |
| 1-12 | 1 | 0.02 | 0.0015 | 0.01 | 0.98 | 8.8 | 0.18 | 649 | 616 | 499 | ○ | ○ |
| 1-13 | 1 | 0.02 | 0.005 | 0.01 | 0.98 | 8.8 | 0.17 | 641 | 611 | 476 | ○ | ○ |
| 1-14 | 1 | 0.02 | 0.007 | 0.01 | 0.98 | 8.8 | 0.17 | 620 | 600 | 323 | ○ | ○ |
| 1-15 | 1 | 0.02 | 0.03 | 0.01 | 0.98 | 9.0 | 0.10 | 644 | 598 | 710 | ○ | |
| *1-16 | 1 | 0.02 | 0.04 | 0.01 | 0.98 | 9.1 | 0.10 | 655 | 578 | 1177 | | |
| *1-17 | 1 | 0.005 | 0.01 | 0.01 | 0.98 | 8.7 | 0.40 | 760 | 663 | 1276 | | |
| 1-18 | 1 | 0.01 | 0.01 | 0.01 | 0.98 | 8.8 | 0.20 | 599 | 549 | 827 | ○ | |
| 1-19 | 1 | 0.017 | 0.01 | 0.01 | 0.98 | 8.8 | 0.16 | 570 | 547 | 402 | ○ | ○ |
| 1-20 | 1 | 0.023 | 0.01 | 0.01 | 0.98 | 8.9 | 0.15 | 558 | 531 | 479 | ○ | ○ |
| 1-21 | 1 | 0.06 | 0.01 | 0.01 | 0.98 | 9.2 | 0.10 | 399 | 360 | 979 | ○ | |
| *1-22 | 1 | 0.07 | 0.01 | 0.01 | 0.98 | 9.3 | 0.14 | 386 | 334 | 1333 | | |
| 1-23 | 1 | 0.02 | 0.01 | 0.005 | 0.98 | 8.8 | 0.20 | 657 | 603 | 825 | ○ | |
| 1-24 | 1 | 0.02 | 0.01 | 0.008 | 0.98 | 8.8 | 0.19 | 639 | 585 | 849 | ○ | |
| 1-25 | 1 | 0.02 | 0.01 | 0.013 | 0.98 | 8.9 | 0.18 | 638 | 607 | 493 | ○ | ○ |
| 1-26 | 1 | 0.02 | 0.01 | 0.015 | 0.98 | 8.9 | 0.18 | 636 | 579 | 883 | ○ | |
| 1-27 | 1 | 0.02 | 0.01 | 0.03 | 0.98 | 9.0 | 0.16 | 618 | 560 | 925 | ○ | |
| *1-28 | 1 | 0.02 | 0.01 | 0.04 | 0.98 | 9.1 | 0.14 | 599 | 531 | 1129 | | |
| 1-29 | 1 | 0.02 | 0.01 | 0.01 | 0.97 | 8.9 | 0.14 | 618 | 600 | 293 | ○ | ○ |
| 1-30 | 1 | 0.02 | 0.01 | 0.01 | 0.99 | 8.9 | 0.15 | 616 | 559 | 928 | ○ | |
| *1-31 | 1 | 0.02 | 0.01 | 0 | 0.98 | 8.8 | 0.40 | 695 | 616 | 1135 | | |
| 1-32 | 1 | 0.02 | 0.03 | 0.01 | 0.98 | 9.0 | 0.05 | 240 | 217 | 953 | ○ | |
| *1-33 | 1 | 0.02 | 0.03 | 0.01 | 0.98 | 9.0 | 0.04 | 189 | 161 | 1463 | | |
| *1-34 | 1 | 0.02 | 0.01 | 0.01 | 0.98 | 8.9 | 0.26 | 1539 | 1214 | 2112 | | |
| 1-35 | 1 | 0.02 | 0.01 | 0.0002 | 0.98 | 8.8 | 0.2 | 665 | 599 | 987 | ○ | |

*Asterisked samples do not fall within the scope of the present invention.

As clear from Table 2, in samples Nos. 1-2 to 1-8, 1-11 to 1-15, 1-18 to 1-21, 1-23 to 1-27, 1-29, 1-30, 1-32 and 1-35, which are fallen in the scope of the present invention, the relative dielectric constant at 25° C. is 239 or more, the relative dielectric constant at 125° C. is 217 or more, and the temperature coefficient in relative dielectric constant in a temperature range from 25° C. to 125° C. is 987×10$^{-6}$/° C. or less as the absolute value.

In particular, in the samples Nos. 1-4 to 1-6, 1-12 to 1-14, 1-19, 1-20, 1-25 and 1-29, the relative dielectric constant at 25° C. is 558 or more, the relative dielectric constant at 125° C. is 468 or more, the temperature coefficient in relative dielectric constant in a temperature range from 25° C. to 125° C. is 499×10$^{-6}$/° C. or less as the absolute value, and the curve indicating the rate of change in relative dielectric constant had two peaks in a temperature range from −55° C. to 125° C. No large hysteresis was observed in the measurements of electric-field versus dielectric polarization characteristic. These samples include, with respect to 1 mole of barium, 0.017 to 0.023 mole of the MgO, Gd equivalent to 0.0015 to 0.01 mole of Gd$_2$O$_3$ and 0.01 to 0.013 mole of the MnO, and the content of the Yb$_2$O$_3$ is 6.3 to 15.6 parts by mass with respect to 100 parts by mass of the barium titanate as a main component. The titanium ratio over 1 mole of barium is 0.97 to 0.98.

Figure 2:
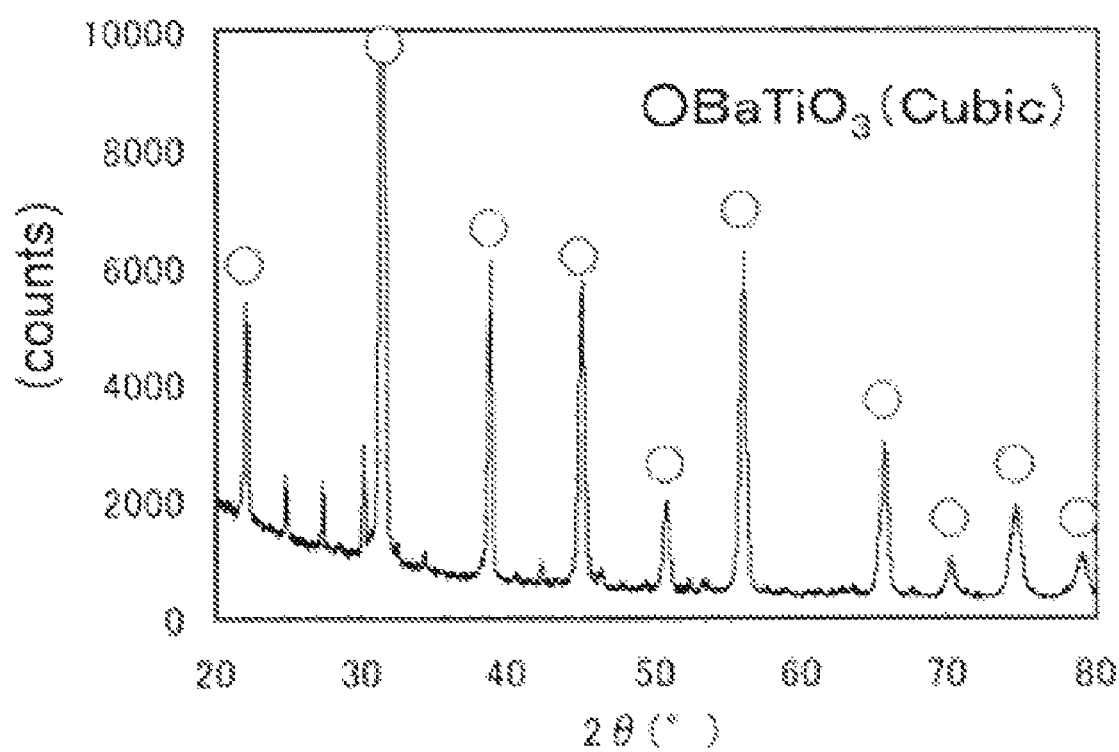
FIG. 2 is a diagram showing an X-ray diffraction pattern of the dielectric ceramic (Sample No. 1-4) obtained in Example 1.

Samples having almost no hysteresis had a polarization charge of 40 nC/cm$^2$ or less at 0V. FIG. 2 is a diagram showing an X-ray diffraction pattern of the dielectric ceramic (Sample No. 1-4) obtained in Example 1. As clear from FIG. 2, the dielectric ceramic in sample No. 4 had a crystal structure mainly comprising the cubic system. In the same manner, the other samples in the scope of the present invention also had the crystal structure mainly comprising the cubic system.

In contrast, in samples Nos. 1-1, 1-9, 1-10, 1-16, 1-17, 1-22, 1-28, 1-31, 1-33 and 1-34, which are out of the scope of the present invention, the absolute values of the temperature coefficient in relative dielectric constant were greater than 1000×10$^{-6}$/° C.

Example 2

Among components used in Example 1, the Gd$_2$O$_3$ which is a component as an additive is substituted by Tb$_2$O$_3$, but the samples were prepared by the same process of Example 1 and evaluated in the same way (samples Nos. 2-1 to 2-35).

Compositions of powder mixtures, average particle sizes of calcined powders, and sintering temperatures are shown in the Tables 3. The average grain sizes of the crystal grains and the characteristics (relative dielectric constant, absolute values of temperature coefficients of relative dielectric constant, temperature change curves in relative dielectric constant and polarized charges) of the sintered samples are shown in Tables 4.

The amounts of the Yb$_2$O$_3$ additive in the Table 3 and the amounts of the Yb$_2$O$_3$ in Table 4 are same as those in Example 1, respectively. In addition, corresponds to a mass ratio relative to 100 parts by mass of barium titanate in the dielectric ceramic (sample). Amounts of the Mg, the rare earth element (RE) and the Mn in Table 4 correspond to converted amounts based on oxide as same in Example 1. "Average grain size of crystal grains" and "the absolute value of temperature coefficient in relative dielectric constant" in Table 4 have the same meaning as Example 1. "○" and no "○" in the "curve of the rate of change in the relative dielectric constant" column and the "polarized charge" column in Table 4 have the same meaning as in Example 1.

TABLE 3

| Sample No. | Ba mole | MgO mole | TbO$_{3/2}$ mole | MnCO$_3$ mole | Ti mole | Yb$_2$O$_3$ parts by mass | Avarage Particle Size of Calcinated Powder μm | Sintering Temperature °C. |
|---|---|---|---|---|---|---|---|---|
| *2-1 | 1 | 0.02 | 0.01 | 0.01 | 0.98 | 2.0 | 0.1 | 1350 |
| 2-2 | 1 | 0.02 | 0.01 | 0.01 | 0.98 | 3.5 | 0.1 | 1350 |
| 2-3 | 1 | 0.02 | 0.01 | 0.01 | 0.98 | 4.0 | 0.1 | 1350 |
| 2-4 | 1 | 0.02 | 0.01 | 0.01 | 0.98 | 6.0 | 0.1 | 1350 |
| 2-5 | 1 | 0.02 | 0.01 | 0.01 | 0.98 | 8.5 | 0.1 | 1350 |
| 2-6 | 1 | 0.02 | 0.01 | 0.01 | 0.98 | 15.0 | 0.1 | 1350 |
| 2-7 | 1 | 0.02 | 0.01 | 0.01 | 0.98 | 20.0 | 0.1 | 1350 |
| 2-8 | 1 | 0.02 | 0.01 | 0.01 | 0.98 | 50.0 | 0.1 | 1350 |
| *2-9 | 1 | 0.02 | 0.01 | 0.01 | 0.98 | 55.0 | 0.1 | 1350 |
| *2-10 | 1 | 0.02 | 0.0002 | 0.01 | 0.98 | 8.5 | 0.1 | 1350 |
| 2-11 | 1 | 0.02 | 0.0007 | 0.01 | 0.98 | 8.5 | 0.1 | 1350 |
| 2-12 | 1 | 0.02 | 0.0015 | 0.01 | 0.98 | 8.5 | 0.1 | 1350 |
| 2-13 | 1 | 0.02 | 0.005 | 0.01 | 0.98 | 8.5 | 0.1 | 1350 |
| 2-14 | 1 | 0.02 | 0.007 | 0.01 | 0.98 | 8.5 | 0.1 | 1350 |
| 2-15 | 1 | 0.02 | 0.03 | 0.01 | 0.98 | 8.5 | 0.1 | 1350 |
| *2-16 | 1 | 0.02 | 0.04 | 0.01 | 0.98 | 8.5 | 0.1 | 1350 |
| *2-17 | 1 | 0.005 | 0.01 | 0.01 | 0.98 | 8.5 | 0.1 | 1350 |
| 2-18 | 1 | 0.01 | 0.01 | 0.01 | 0.98 | 8.5 | 0.1 | 1350 |
| 2-19 | 1 | 0.017 | 0.01 | 0.01 | 0.98 | 8.5 | 0.1 | 1350 |
| 2-20 | 1 | 0.023 | 0.01 | 0.01 | 0.98 | 8.5 | 0.1 | 1350 |
| 2-21 | 1 | 0.06 | 0.01 | 0.01 | 0.98 | 8.5 | 0.1 | 1350 |
| *2-22 | 1 | 0.07 | 0.01 | 0.01 | 0.98 | 8.5 | 0.1 | 1350 |
| 2-23 | 1 | 0.02 | 0.01 | 0.005 | 0.98 | 8.5 | 0.1 | 1350 |
| 2-24 | 1 | 0.02 | 0.01 | 0.008 | 0.98 | 8.5 | 0.1 | 1350 |
| 2-25 | 1 | 0.02 | 0.01 | 0.013 | 0.98 | 8.5 | 0.1 | 1350 |
| 2-26 | 1 | 0.02 | 0.01 | 0.015 | 0.98 | 8.5 | 0.1 | 1350 |
| 2-27 | 1 | 0.02 | 0.01 | 0.03 | 0.98 | 8.5 | 0.1 | 1350 |
| *2-28 | 1 | 0.02 | 0.01 | 0.04 | 0.98 | 8.5 | 0.1 | 1350 |
| 2-29 | 1 | 0.02 | 0.01 | 0.01 | 0.97 | 8.5 | 0.1 | 1350 |
| 2-30 | 1 | 0.02 | 0.01 | 0.01 | 0.99 | 8.5 | 0.1 | 1350 |
| *2-31 | 1 | 0.02 | 0.01 | 0 | 0.98 | 8.5 | 0.1 | 1350 |
| 2-32 | 1 | 0.02 | 0.03 | 0.01 | 0.98 | 8.5 | 0.04 | 1350 |
| *2-33 | 1 | 0.02 | 0.03 | 0.01 | 0.98 | 8.5 | 0.04 | 1320 |
| *2-34 | 1 | 0.02 | 0.01 | 0.01 | 0.98 | 8.5 | 0.1 | 1380 |
| 2-35 | 1 | 0.02 | 0.01 | 0.0002 | 0.98 | 8.5 | 0.1 | 1350 |

*Asterisked samples do not fall within the scope of the present invention.

TABLE 4

| Sample No. | Composition | | | | | Yb$_2$O$_3$ parts by mass | Avarage Crystal Grain Size μm | Relative Dielectric Constant (ϵr) | | Maximum Abusolute Valure of Temperature Coefficient of ϵr | Temperature Dependence Curve of ϵr | Poralized Charge |
|---|---|---|---|---|---|---|---|---|---|---|---|---|
| | Ba mole | MgO mole | TbO$_{3/2}$ mole | MnO mole | Ti mole | | | 25° C. | 125° C. | 25 to 125° C. ×10$^{-6}$/° C. | ○: Two Peaks observed | ○: 20 nC/cm$^2$ or less |
| *2-1 | 1 | 0.02 | 0.01 | 0.01 | 0.98 | 2.1 | 0.40 | 2444 | 1434 | 4133 | | |
| 2-2 | 1 | 0.02 | 0.01 | 0.01 | 0.98 | 3.6 | 0.20 | 1019 | 918 | 986 | ○ | |
| 2-3 | 1 | 0.02 | 0.01 | 0.01 | 0.98 | 4.2 | 0.18 | 795 | 719 | 958 | ○ | |
| 2-4 | 1 | 0.02 | 0.01 | 0.01 | 0.98 | 6.3 | 0.17 | 660 | 636 | 361 | ○ | ○ |
| 2-5 | 1 | 0.02 | 0.01 | 0.01 | 0.98 | 8.9 | 0.15 | 631 | 606 | 393 | ○ | ○ |
| 2-6 | 1 | 0.02 | 0.01 | 0.01 | 0.98 | 15.6 | 0.15 | 611 | 585 | 421 | ○ | ○ |
| 2-7 | 1 | 0.02 | 0.01 | 0.01 | 0.98 | 20.8 | 0.15 | 601 | 561 | 670 | ○ | |
| 2-8 | 1 | 0.02 | 0.01 | 0.01 | 0.98 | 52.1 | 0.15 | 244 | 222 | 934 | ○ | |
| *2-9 | 1 | 0.02 | 0.01 | 0.01 | 0.98 | 57.3 | 0.15 | 175 | 157 | 1030 | | |
| *2-10 | 1 | 0.02 | 0.0002 | 0.01 | 0.98 | 8.8 | 0.40 | 776 | 658 | 1519 | | |
| 2-11 | 1 | 0.02 | 0.0007 | 0.01 | 0.98 | 8.8 | 0.20 | 698 | 639 | 855 | ○ | |
| 2-12 | 1 | 0.02 | 0.0015 | 0.01 | 0.98 | 8.8 | 0.18 | 663 | 630 | 491 | ○ | ○ |
| 2-13 | 1 | 0.02 | 0.005 | 0.01 | 0.98 | 8.8 | 0.17 | 655 | 624 | 467 | ○ | ○ |
| 2-14 | 1 | 0.02 | 0.007 | 0.01 | 0.98 | 8.8 | 0.17 | 633 | 613 | 315 | ○ | ○ |
| 2-15 | 1 | 0.02 | 0.03 | 0.01 | 0.98 | 9.0 | 0.10 | 658 | 612 | 701 | ○ | |
| *2-16 | 1 | 0.02 | 0.04 | 0.01 | 0.98 | 9.1 | 0.10 | 668 | 590 | 1169 | | |
| *2-17 | 1 | 0.005 | 0.01 | 0.01 | 0.98 | 8.7 | 0.40 | 776 | 678 | 1269 | | |
| 2-18 | 1 | 0.01 | 0.01 | 0.01 | 0.98 | 8.8 | 0.20 | 611 | 561 | 818 | ○ | |
| 2-19 | 1 | 0.017 | 0.01 | 0.01 | 0.98 | 8.8 | 0.16 | 582 | 559 | 392 | ○ | ○ |
| 2-20 | 1 | 0.023 | 0.01 | 0.01 | 0.98 | 8.9 | 0.15 | 569 | 543 | 469 | ○ | ○ |
| 2-21 | 1 | 0.06 | 0.01 | 0.01 | 0.98 | 9.2 | 0.10 | 407 | 368 | 965 | ○ | |

TABLE 4-continued

| Sample No. | Composition | | | | | Avarage Crystal Grain Size μm | Relative Dielectric Constant (εr) | | Maximum Absulute Valure of Temperature Coefficient of εr | Temperature Dependence Curve of εr | Poralized Charge |
|---|---|---|---|---|---|---|---|---|---|---|---|
| | Ba mole | MgO mole | TbO$_{3/2}$ mole | MnO mole | Ti mole | Yb$_2$O$_3$ parts by mass | | | | ○: Two Peaks observed | ○: 20 nC/cm$^2$ or less |
| | | | | | | | 25° C. | 125° C. | 25 to 125° C. ×10$^{-6}$/° C. | | |
| *2-22 | 1 | 0.07 | 0.01 | 0.01 | 0.98 | 9.3 | 0.14 | 394 | 342 | 1319 | | |
| 2-23 | 1 | 0.02 | 0.01 | 0.005 | 0.98 | 8.8 | 0.20 | 671 | 616 | 817 | ○ | |
| 2-24 | 1 | 0.02 | 0.01 | 0.008 | 0.98 | 8.8 | 0.19 | 653 | 598 | 840 | ○ | |
| 2-25 | 1 | 0.02 | 0.01 | 0.013 | 0.98 | 8.9 | 0.18 | 652 | 620 | 484 | ○ | ○ |
| 2-26 | 1 | 0.02 | 0.01 | 0.015 | 0.98 | 8.9 | 0.18 | 649 | 592 | 875 | ○ | |
| 2-27 | 1 | 0.02 | 0.01 | 0.03 | 0.98 | 9.0 | 0.16 | 631 | 573 | 916 | ○ | |
| *2-28 | 1 | 0.02 | 0.01 | 0.04 | 0.98 | 9.1 | 0.14 | 611 | 543 | 1120 | | |
| 2-29 | 1 | 0.02 | 0.01 | 0.01 | 0.97 | 8.9 | 0.14 | 631 | 613 | 285 | ○ | ○ |
| 2-30 | 1 | 0.02 | 0.01 | 0.01 | 0.99 | 8.9 | 0.15 | 629 | 571 | 919 | ○ | |
| *2-31 | 1 | 0.02 | 0.01 | 0 | 0.98 | 8.8 | 0.40 | 710 | 630 | 1128 | | |
| 2-32 | 1 | 0.02 | 0.03 | 0.01 | 0.98 | 9.0 | 0.05 | 245 | 223 | 931 | ○ | |
| *2-33 | 1 | 0.02 | 0.03 | 0.01 | 0.98 | 9.0 | 0.04 | 193 | 165 | 1434 | | |
| *2-34 | 1 | 0.02 | 0.01 | 0.01 | 0.98 | 8.9 | 0.26 | 1571 | 1240 | 2108 | | |
| 2-35 | 1 | 0.02 | 0.01 | 0.0002 | 0.98 | 8.8 | 0.2 | 679 | 612 | 994 | ○ | |

*Asterisked samples do not fall within the scope of the present invention.

As clear from Table 4, in samples Nos. 2-2 to 2-8, 2-11 to 2-15, 2-18 to 2-21, 2-23 to 2-27, 2-29, 2-30, 2-32 and 2-35, which are fallen in the scope of the present invention, the relative dielectric constant at 25° C. is 244 or more, the relative dielectric constant at 125° C. is 222 or more, and the temperature coefficient in relative dielectric constant in a temperature range from 25° C. to 125° C. is 994×10$^{-6}$/° C. or less as the absolute value.

In particular, in the samples Nos. 2-4 to 2-6, 2-12 to 2-14, 2-19, 2-20, 2-25 and 2-29, the relative dielectric constant at 25° C. is 569 or more, the relative dielectric constant at 125° C. is 479 or more, the temperature coefficient in relative dielectric constant in a temperature range from 25° C. to 125° C. is 491×10$^{-6}$/° C. or less as the absolute value, and the curve indicating the rate of change in relative dielectric constant had two peaks in a temperature range from −55° C. to 125° C. No large hysteresis was observed in the measurements of electric-field versus dielectric polarization characteristic. These samples include, with respect to 1 mole of barium, 0.017 to 0.023 mole of the MgO, Tb equivalent to 0.0015 to 0.01 mole of Tb$_2$O$_3$ and 0.01 to 0.013 mole of the MnO, and the content of the Yb$_2$O$_3$ is 6.3 to 15.6 parts by mass with respect to 100 parts by mass of the barium titanate as a main component. The titanium ratio over 1 mole of barium is 0.97 to 0.98.

Samples having almost no hysteresis had a polarization charge of 40 nC/cm$^2$ or less at 0V. The dielectric ceramic (sample Nos. 2-2 to 2-8, 2-11 to 2-15, 2-18 to 2-21, 2-23 to 2-27, 2-29, 2-30, 2-32 and 2-35) in Example 2 had a crystal structure mainly comprising the cubic system which is similar to X-ray diffraction pattern shown in FIG. 2.

In contrast, in samples Nos. 2-1, 2-9, 2-10, 2-16, 2-17, 2-22, 2-28, 2-31, 2-33 and 2-34, which are out of the scope of the present invention, the absolute values of the temperature coefficient in relative dielectric constant were greater than 1000×10$^{-6}$/° C.

Example 3

Among components used in Example 1, the Gd$_2$O$_3$ which is a component as an additive is substituted by Dy$_2$O$_3$, but the samples were prepared by the same process of Example 1 and evaluated in the same way (samples Nos. 3-1 to 3-35).

Compositions of powder mixtures, average particle sizes of calcined powders and sintering temperatures are shown in the Tables 5. The average grain sizes of the crystal grains and the characteristics (relative dielectric constant, absolute values of temperature coefficients of relative dielectric constant, temperature change curves in relative dielectric constant and polarized charges) of the sintered samples are shown in Tables 5.

The amounts of the Yb$_2$O$_3$ additive in the Table 5 and the amounts of the Yb$_2$O$_3$ in Table 6 are same as those in Example 1, respectively. In addition, corresponds to a mass ratio relative to 100 parts by mass of barium titanate in the dielectric ceramic (sample). Amounts of the Mg, the rare earth element (RE) and the Mn in Table 6 correspond to converted amounts based on oxide as same in Example 1. "Average grain size of crystal grains" and "the absolute value of temperature coefficient in relative dielectric constant" in Table 6 have the same meaning as Example 1. "○" and no "○" in the "curve of the rate of change in the relative dielectric constant" column and the "polarized charge" column in Table 6 have the same meaning as in Example 1.

TABLE 5

| Sample No. | Composition | | | | | | Avarage Particle Size of Calcinated Powder μm | Sintering Temperature ° C. |
|---|---|---|---|---|---|---|---|---|
| | Ba mole | MgO mole | DyO$_{3/2}$ mole | MnCO$_3$ mole | Ti mole | Yb$_2$O$_3$ parts by mass | | |
| *3-1 | 1 | 0.02 | 0.01 | 0.01 | 0.98 | 2.0 | 0.1 | 1350 |
| 3-2 | 1 | 0.02 | 0.01 | 0.01 | 0.98 | 3.5 | 0.1 | 1350 |
| 3-3 | 1 | 0.02 | 0.01 | 0.01 | 0.98 | 4.0 | 0.1 | 1350 |

TABLE 5-continued

| Sample No. | Ba mole | MgO mole | DyO$_{3/2}$ mole | MnCO$_3$ mole | Ti mole | Yb$_2$O$_3$ parts by mass | Average Particle Size of Calcinated Powder μm | Sintering Temperature °C. |
|---|---|---|---|---|---|---|---|---|
| 3-4 | 1 | 0.02 | 0.01 | 0.01 | 0.98 | 6.0 | 0.1 | 1350 |
| 3-5 | 1 | 0.02 | 0.01 | 0.01 | 0.98 | 8.5 | 0.1 | 1350 |
| 3-6 | 1 | 0.02 | 0.01 | 0.01 | 0.98 | 15.0 | 0.1 | 1350 |
| 3-7 | 1 | 0.02 | 0.01 | 0.01 | 0.98 | 20.0 | 0.1 | 1350 |
| 3-8 | 1 | 0.02 | 0.01 | 0.01 | 0.98 | 50.0 | 0.1 | 1350 |
| *3-9 | 1 | 0.02 | 0.01 | 0.01 | 0.98 | 55.0 | 0.1 | 1350 |
| *3-10 | 1 | 0.02 | 0.0002 | 0.01 | 0.98 | 8.5 | 0.1 | 1350 |
| 3-11 | 1 | 0.02 | 0.0007 | 0.01 | 0.98 | 8.5 | 0.1 | 1350 |
| 3-12 | 1 | 0.02 | 0.0015 | 0.01 | 0.98 | 8.5 | 0.1 | 1350 |
| 3-13 | 1 | 0.02 | 0.005 | 0.01 | 0.98 | 8.5 | 0.1 | 1350 |
| 3-14 | 1 | 0.02 | 0.007 | 0.01 | 0.98 | 8.5 | 0.1 | 1350 |
| 3-15 | 1 | 0.02 | 0.03 | 0.01 | 0.98 | 8.5 | 0.1 | 1350 |
| *3-16 | 1 | 0.02 | 0.04 | 0.01 | 0.98 | 8.5 | 0.1 | 1350 |
| *3-17 | 1 | 0.005 | 0.01 | 0.01 | 0.98 | 8.5 | 0.1 | 1350 |
| 3-18 | 1 | 0.01 | 0.01 | 0.01 | 0.98 | 8.5 | 0.1 | 1350 |
| 3-19 | 1 | 0.017 | 0.01 | 0.01 | 0.98 | 8.5 | 0.1 | 1350 |
| 3-20 | 1 | 0.023 | 0.01 | 0.01 | 0.98 | 8.5 | 0.1 | 1350 |
| 3-21 | 1 | 0.06 | 0.01 | 0.01 | 0.98 | 8.5 | 0.1 | 1350 |
| *3-22 | 1 | 0.07 | 0.01 | 0.01 | 0.98 | 8.5 | 0.1 | 1350 |
| 3-23 | 1 | 0.02 | 0.01 | 0.005 | 0.98 | 8.5 | 0.1 | 1350 |
| 3-24 | 1 | 0.02 | 0.01 | 0.008 | 0.98 | 8.5 | 0.1 | 1350 |
| 3-25 | 1 | 0.02 | 0.01 | 0.013 | 0.98 | 8.5 | 0.1 | 1350 |
| 3-26 | 1 | 0.02 | 0.01 | 0.015 | 0.98 | 8.5 | 0.1 | 1350 |
| 3-27 | 1 | 0.02 | 0.01 | 0.03 | 0.98 | 8.5 | 0.1 | 1350 |
| *3-28 | 1 | 0.02 | 0.01 | 0.04 | 0.98 | 8.5 | 0.1 | 1350 |
| 3-29 | 1 | 0.02 | 0.01 | 0.01 | 0.97 | 8.5 | 0.1 | 1350 |
| 3-30 | 1 | 0.02 | 0.01 | 0.01 | 0.99 | 8.5 | 0.1 | 1350 |
| *3-31 | 1 | 0.02 | 0.01 | 0 | 0.98 | 8.5 | 0.1 | 1350 |
| 3-32 | 1 | 0.02 | 0.03 | 0.01 | 0.98 | 8.5 | 0.04 | 1350 |
| *3-33 | 1 | 0.02 | 0.03 | 0.01 | 0.98 | 8.5 | 0.04 | 1320 |
| *3-34 | 1 | 0.02 | 0.01 | 0.01 | 0.98 | 8.5 | 0.1 | 1380 |
| 3-35 | 1 | 0.02 | 0.01 | 0.0002 | 0.98 | 8.5 | 0.1 | 1350 |

*Asterisked samples do not fall within the scope of the present invention.

TABLE 6

| | Composition | | | | | Average Crystal Grain Size μm | Relative Dielectric Constant (εr) | | Maximum Absolute Value of Temperature Coefficient of εr | Temperature Dependence Curve of εr | Poralized Charge |
|---|---|---|---|---|---|---|---|---|---|---|---|
| Sample No. | Ba mole | MgO mole | DyO$_{3/2}$ mole | MnO mole | Ti mole | Yb$_2$O$_3$ parts by mass | | 25° C. | 125° C. | 25 to 125° C. ×10$^{-6}$/° C. | ○: Two Peaks observed | ○: 20 nC/cm$^2$ or less |
| *3-1 | 1 | 0.02 | 0.01 | 0.01 | 0.98 | 2.1 | 0.40 | 1814 | 1061 | 4155 | | |
| 3-2 | 1 | 0.02 | 0.01 | 0.01 | 0.98 | 3.6 | 0.20 | 756 | 683 | 971 | ○ | |
| 3-3 | 1 | 0.02 | 0.01 | 0.01 | 0.98 | 4.2 | 0.18 | 590 | 541 | 841 | ○ | |
| 3-4 | 1 | 0.02 | 0.01 | 0.01 | 0.98 | 6.3 | 0.17 | 490 | 468 | 440 | ○ | ○ |
| 3-5 | 1 | 0.02 | 0.01 | 0.01 | 0.98 | 8.9 | 0.15 | 468 | 446 | 476 | ○ | ○ |
| 3-6 | 1 | 0.02 | 0.01 | 0.01 | 0.98 | 15.6 | 0.15 | 454 | 431 | 507 | ○ | ○ |
| 3-7 | 1 | 0.02 | 0.01 | 0.01 | 0.98 | 20.8 | 0.15 | 446 | 413 | 757 | ○ | |
| 3-8 | 1 | 0.02 | 0.01 | 0.01 | 0.98 | 52.1 | 0.15 | 181 | 163 | 990 | ○ | |
| *3-9 | 1 | 0.02 | 0.01 | 0.01 | 0.98 | 57.3 | 0.15 | 130 | 112 | 1330 | | |
| *3-10 | 1 | 0.02 | 0.01 | 0.01 | 0.98 | 8.9 | 0.40 | 576 | 485 | 1587 | | |
| 3-11 | 1 | 0.02 | 0.01 | 0.01 | 0.98 | 8.9 | 0.20 | 518 | 470 | 930 | ○ | |
| 3-12 | 1 | 0.02 | 0.01 | 0.01 | 0.98 | 8.9 | 0.18 | 492 | 464 | 570 | ○ | ○ |
| 3-13 | 1 | 0.02 | 0.01 | 0.01 | 0.98 | 8.9 | 0.17 | 486 | 459 | 547 | ○ | ○ |
| 3-14 | 1 | 0.02 | 0.01 | 0.01 | 0.98 | 8.9 | 0.17 | 470 | 451 | 397 | ○ | ○ |
| 3-15 | 1 | 0.02 | 0.01 | 0.01 | 0.98 | 8.9 | 0.10 | 488 | 450 | 781 | ○ | |
| *3-16 | 1 | 0.02 | 0.01 | 0.01 | 0.98 | 8.9 | 0.10 | 496 | 434 | 1247 | | |
| *3-17 | 1 | 0.005 | 0.01 | 0.01 | 0.98 | 8.7 | 0.40 | 576 | 499 | 1337 | | |
| 3-18 | 1 | 0.01 | 0.01 | 0.01 | 0.98 | 8.8 | 0.20 | 454 | 413 | 904 | ○ | |
| 3-19 | 1 | 0.017 | 0.01 | 0.01 | 0.98 | 8.8 | 0.16 | 432 | 411 | 482 | ○ | ○ |
| 3-20 | 1 | 0.023 | 0.01 | 0.01 | 0.98 | 8.9 | 0.15 | 423 | 403 | 459 | ○ | ○ |
| 3-21 | 1 | 0.06 | 0.01 | 0.01 | 0.98 | 9.2 | 0.10 | 302 | 276 | 880 | ○ | |
| *3-22 | 1 | 0.07 | 0.01 | 0.01 | 0.98 | 9.3 | 0.14 | 292 | 250 | 1452 | | |
| 3-23 | 1 | 0.02 | 0.01 | 0.005 | 0.98 | 8.8 | 0.20 | 498 | 454 | 895 | ○ | |
| 3-24 | 1 | 0.02 | 0.01 | 0.008 | 0.98 | 8.8 | 0.19 | 485 | 440 | 920 | ○ | |

TABLE 6-continued

| | Composition | | | | | Avarage Crystal Grain | Relative Dielectric Constant (εr) | | Maximum Abusolute Valure of Temperature Coefficient of εr | Temperature Dependence Curve of εr | Poralized Charge |
|---|---|---|---|---|---|---|---|---|---|---|---|
| | | | | | $Yb_2O_3$ | | | | | | |
| Sample No. | Ba mole | MgO mole | $DyO_{3/2}$ mole | MnO mole | Ti mole | parts by mass | Size μm | 25° C. | 125° C. | 25 to 125° C. ×10⁻⁶/° C. | ○: Two Peaks observed | ○: 20 nC/cm² or less |
| 3-25 | 1 | 0.02 | 0.01 | 0.013 | 0.98 | 8.9 | 0.18 | 484 | 457 | 565 | ○ | ○ |
| 3-26 | 1 | 0.02 | 0.01 | 0.015 | 0.98 | 8.9 | 0.18 | 482 | 436 | 956 | ○ | |
| 3-27 | 1 | 0.02 | 0.01 | 0.03 | 0.98 | 9.0 | 0.16 | 468 | 421 | 999 | ○ | |
| *3-28 | 1 | 0.02 | 0.01 | 0.04 | 0.98 | 9.1 | 0.14 | 454 | 399 | 1205 | | |
| 3-29 | 1 | 0.02 | 0.01 | 0.01 | 0.97 | 8.9 | 0.14 | 469 | 451 | 368 | ○ | ○ |
| 3-30 | 1 | 0.02 | 0.01 | 0.01 | 0.99 | 8.9 | 0.15 | 467 | 426 | 863 | ○ | |
| *3-31 | 1 | 0.02 | 0.01 | 0 | 0.98 | 8.8 | 0.40 | 527 | 464 | 1201 | | |
| 3-32 | 1 | 0.02 | 0.01 | 0.01 | 0.98 | 8.9 | 0.05 | 182 | 169 | 749 | ○ | |
| *3-33 | 1 | 0.02 | 0.01 | 0.01 | 0.98 | 8.9 | 0.04 | 143 | 119 | 1706 | | |
| *3-34 | 1 | 0.02 | 0.01 | 0.01 | 0.98 | 8.9 | 0.26 | 1166 | 917 | 2142 | | |
| 3-35 | 1 | 0.02 | 0.01 | 0.0002 | 0.98 | 8.8 | 0.2 | 504 | 463 | 813 | ○ | |

*Asterisked samples do not fall within the scope of the present invention.

As clear from Table 6, in samples Nos. 3-2 to 3-8, 3-11 to 3-15, 3-18 to 3-21, 3-23 to 3-27, 3-29, 3-30, 3-32 and 3-35, which are fallen in the scope of the present invention, the relative dielectric constant at 25° C. is 181 or more, the relative dielectric constant at 125° C. is 163 or more, and the temperature coefficient in relative dielectric constant in a temperature range from 25° C. to 125° C. is 999×10⁻⁶/° C. or less as the absolute value.

In particular, in the samples Nos. 3-4 to 3-6, 3-12 to 3-14, 3-19, 3-20, 3-25 and 3-29, the relative dielectric constant at 25° C. is 423 or more, the relative dielectric constant at 125° C. is 403 or more, the temperature coefficient in relative dielectric constant in a temperature range from 25° C. to 125° C. is 570×10⁻⁶/° C. or less as the absolute value, and the curve indicating the rate of change in relative dielectric constant had two peaks in a temperature range from −55° C. to 125° C. No large hysteresis was observed in the measurements of electric-field versus dielectric polarization characteristic. These samples include, with respect to 1 mole of barium, 0.017 to 0.023 mole of the MgO, Dy equivalent to 0.0015 to 0.01 mole of $Dy_2O_3$ and 0.01 to 0.013 mole of the MnO, and the content of the $Yb_2O_3$ is 6.3 to 15.6 parts by mass with respect to 100 parts by mass of the barium titanate as a main component. The titanium ratio over 1 mole of barium is 0.97 to 0.98.

Samples having almost no hysteresis had a polarization charge of 40 nC/cm² or less at 0V. The dielectric ceramic (sample Nos. 3-2 to 3-8, 3-11 to 3-15, 3-18 to 3-21, 3-23 to 3-27, 3-29, 3-30, 3-32 and 3-35) in Example 3 had a crystal structure mainly comprising the cubic system which is similar to X-ray diffraction pattern shown in FIG. 2.

In contrast, in samples Nos. 3-1, 3-9, 3-10, 3-16, 3-17, 3-22, 3-28, 3-31, 3-33 and 3-34, which are out of the scope of the present invention, the absolute values of the temperature coefficient in relative dielectric constant were greater than 1000×10⁻⁶/° C.

Example 4

Next, among components used in Example 1, the $Gd_2O_3$ which is a component as an additive is substituted by $Ho_2O_3$, but the samples were prepared by the same process of Example 1 and evaluated in the same way (samples Nos. 4-1 to 4-35).

Compositions of powder mixtures, average particle sizes of calcined powders and sintering temperatures are shown in the Tables 7. The average grain sizes of the crystal grains and the characteristics (relative dielectric constant, absolute values of temperature coefficients of relative dielectric constant, temperature change curves in relative dielectric constant and polarized charges) of the sintered samples are shown in Tables 8.

The amounts of the $Yb_2O_3$ additive in the Table 7 and the amounts of the $Yb_2O_3$ in Table 8 are same as those in Example 1, respectively. In addition, corresponds to a mass ratio relative to 100 parts by mass of barium titanate in the dielectric ceramic (sample). Amounts of the Mg, the rare earth element (RE) and the Mn in Table 8 correspond to converted amounts based on oxide as same in Example 1. "Average grain size of crystal grains" and "the absolute value of temperature coefficient in relative dielectric constant" in Table 8 have the same meaning as Example 1. "○" and no "○" in the "curve of the rate of change in the relative dielectric constant" column and the "polarized charge" column in Table 8 have the same meaning as in Example 1.

TABLE 7

| | Composition | | | | | | Average Particle Size of Calcinated Powder μm | Sintering Temperature ° C. |
|---|---|---|---|---|---|---|---|---|
| Sample No. | Ba mole | MgO mole | $HoO_{3/2}$ mole | $MnCO_3$ mole | Ti mole | $Yb_2O_3$ parts by mass | | |
| *4-1 | 1 | 0.02 | 0.01 | 0.01 | 0.98 | 2.0 | 0.1 | 1350 |
| 4-2 | 1 | 0.02 | 0.01 | 0.01 | 0.98 | 3.5 | 0.1 | 1350 |
| 4-3 | 1 | 0.02 | 0.01 | 0.01 | 0.98 | 4.0 | 0.1 | 1350 |
| 4-4 | 1 | 0.02 | 0.01 | 0.01 | 0.98 | 6.0 | 0.1 | 1350 |
| 4-5 | 1 | 0.02 | 0.01 | 0.01 | 0.98 | 8.5 | 0.1 | 1350 |
| 4-6 | 1 | 0.02 | 0.01 | 0.01 | 0.98 | 15.0 | 0.1 | 1350 |

TABLE 7-continued

| Sample No. | Ba mole | MgO mole | HoO$_{3/2}$ mole | MnCO$_3$ mole | Ti mole | Yb$_2$O$_3$ parts by mass | Avarage Particle Size of Calcinated Powder μm | Sintering Temperature ° C. |
|---|---|---|---|---|---|---|---|---|
| 4-7 | 1 | 0.02 | 0.01 | 0.01 | 0.98 | 20.0 | 0.1 | 1350 |
| 4-8 | 1 | 0.02 | 0.01 | 0.01 | 0.98 | 50.0 | 0.1 | 1350 |
| *4-9 | 1 | 0.02 | 0.01 | 0.01 | 0.98 | 55.0 | 0.1 | 1350 |
| *4-10 | 1 | 0.02 | 0.0002 | 0.01 | 0.98 | 8.5 | 0.1 | 1350 |
| 4-11 | 1 | 0.02 | 0.0007 | 0.01 | 0.98 | 8.5 | 0.1 | 1350 |
| 4-12 | 1 | 0.02 | 0.0015 | 0.01 | 0.98 | 8.5 | 0.1 | 1350 |
| 4-13 | 1 | 0.02 | 0.005 | 0.01 | 0.98 | 8.5 | 0.1 | 1350 |
| 4-14 | 1 | 0.02 | 0.007 | 0.01 | 0.98 | 8.5 | 0.1 | 1350 |
| 4-15 | 1 | 0.02 | 0.03 | 0.01 | 0.98 | 8.5 | 0.1 | 1350 |
| *4-16 | 1 | 0.02 | 0.04 | 0.01 | 0.98 | 8.5 | 0.1 | 1350 |
| *4-17 | 1 | 0.005 | 0.01 | 0.01 | 0.98 | 8.5 | 0.1 | 1350 |
| 4-18 | 1 | 0.01 | 0.01 | 0.01 | 0.98 | 8.5 | 0.1 | 1350 |
| 4-19 | 1 | 0.017 | 0.01 | 0.01 | 0.98 | 8.5 | 0.1 | 1350 |
| 4-20 | 1 | 0.023 | 0.01 | 0.01 | 0.98 | 8.5 | 0.1 | 1350 |
| 4-21 | 1 | 0.06 | 0.01 | 0.01 | 0.98 | 8.5 | 0.1 | 1350 |
| *4-22 | 1 | 0.07 | 0.01 | 0.01 | 0.98 | 8.5 | 0.1 | 1350 |
| 4-23 | 1 | 0.02 | 0.01 | 0.005 | 0.98 | 8.5 | 0.1 | 1350 |
| 4-24 | 1 | 0.02 | 0.01 | 0.008 | 0.98 | 8.5 | 0.1 | 1350 |
| 4-25 | 1 | 0.02 | 0.01 | 0.013 | 0.98 | 8.5 | 0.1 | 1350 |
| 4-26 | 1 | 0.02 | 0.01 | 0.015 | 0.98 | 8.5 | 0.1 | 1350 |
| 4-27 | 1 | 0.02 | 0.01 | 0.03 | 0.98 | 8.5 | 0.1 | 1350 |
| *4-28 | 1 | 0.02 | 0.01 | 0.04 | 0.98 | 8.5 | 0.1 | 1350 |
| 4-29 | 1 | 0.02 | 0.01 | 0.01 | 0.97 | 8.5 | 0.1 | 1350 |
| 4-30 | 1 | 0.02 | 0.01 | 0.01 | 0.99 | 8.5 | 0.1 | 1350 |
| *4-31 | 1 | 0.02 | 0.01 | 0 | 0.98 | 8.5 | 0.1 | 1350 |
| 4-32 | 1 | 0.02 | 0.03 | 0.01 | 0.98 | 8.5 | 0.04 | 1350 |
| *4-33 | 1 | 0.02 | 0.03 | 0.01 | 0.98 | 8.5 | 0.04 | 1320 |
| *4-34 | 1 | 0.02 | 0.01 | 0.01 | 0.98 | 8.5 | 0.1 | 1380 |
| 4-35 | 1 | 0.02 | 0.01 | 0.0002 | 0.98 | 8.5 | 0.1 | 1350 |

*Asterisked samples do not fall within the scope of the present invention.

TABLE 8

| Sample No. | Composition | | | | | | Avarage Crystal Grain Size μm | Relative Dielectric Constant (εr) | | Maximum Abusolute Valure of Temperature Coefficient of εr | Temperature Dependence Curve of εr | Poralized Charge |
|---|---|---|---|---|---|---|---|---|---|---|---|---|
| | Ba mole | MgO mole | HoO$_{3/2}$ mole | MnO mole | Ti mole | Yb$_2$O$_3$ parts by mass | | 25° C. | 125° C. | 25 to 125° C. ×10$^{-6}$/° C. | ○: Two Peaks observed | ○: 20 nC/cm$^2$ or less |
| *4-1 | 1 | 0.02 | 0.01 | 0.01 | 0.98 | 2.1 | 0.40 | 2570 | 1509 | 4129 | | |
| 4-2 | 1 | 0.02 | 0.01 | 0.01 | 0.98 | 3.6 | 0.20 | 1071 | 969 | 957 | ○ | |
| 4-3 | 1 | 0.02 | 0.01 | 0.01 | 0.98 | 4.2 | 0.18 | 836 | 765 | 860 | ○ | |
| 4-4 | 1 | 0.02 | 0.01 | 0.01 | 0.98 | 6.3 | 0.17 | 694 | 670 | 345 | ○ | ○ |
| 4-5 | 1 | 0.02 | 0.01 | 0.01 | 0.98 | 8.9 | 0.15 | 663 | 638 | 377 | ○ | ○ |
| 4-6 | 1 | 0.02 | 0.01 | 0.01 | 0.98 | 15.6 | 0.15 | 643 | 617 | 405 | ○ | ○ |
| 4-7 | 1 | 0.02 | 0.01 | 0.01 | 0.98 | 20.8 | 0.15 | 632 | 591 | 653 | ○ | |
| 4-8 | 1 | 0.02 | 0.01 | 0.01 | 0.98 | 52.1 | 0.15 | 257 | 234 | 892 | ○ | |
| *4-9 | 1 | 0.02 | 0.01 | 0.01 | 0.98 | 57.3 | 0.15 | 184 | 163 | 1138 | | |
| *4-10 | 1 | 0.02 | 0.0002 | 0.01 | 0.98 | 8.8 | 0.40 | 816 | 693 | 1506 | | |
| 4-11 | 1 | 0.02 | 0.0007 | 0.01 | 0.98 | 8.8 | 0.20 | 734 | 673 | 840 | ○ | |
| 4-12 | 1 | 0.02 | 0.0015 | 0.01 | 0.98 | 8.8 | 0.18 | 697 | 664 | 476 | ○ | ○ |
| 4-13 | 1 | 0.02 | 0.005 | 0.01 | 0.98 | 8.8 | 0.17 | 689 | 657 | 452 | ○ | ○ |
| 4-14 | 1 | 0.02 | 0.007 | 0.01 | 0.98 | 8.8 | 0.17 | 666 | 646 | 298 | ○ | ○ |
| 4-15 | 1 | 0.02 | 0.03 | 0.01 | 0.98 | 9.0 | 0.10 | 692 | 644 | 686 | ○ | |
| *4-16 | 1 | 0.02 | 0.04 | 0.01 | 0.98 | 9.1 | 0.10 | 703 | 622 | 1154 | | |
| *4-17 | 1 | 0.005 | 0.01 | 0.01 | 0.98 | 8.7 | 0.40 | 816 | 714 | 1256 | | |
| 4-18 | 1 | 0.01 | 0.01 | 0.01 | 0.98 | 8.8 | 0.20 | 643 | 591 | 801 | ○ | |
| 4-19 | 1 | 0.017 | 0.01 | 0.01 | 0.98 | 8.8 | 0.16 | 612 | 589 | 375 | ○ | ○ |
| 4-20 | 1 | 0.023 | 0.01 | 0.01 | 0.98 | 8.9 | 0.15 | 599 | 572 | 451 | ○ | ○ |
| 4-21 | 1 | 0.06 | 0.01 | 0.01 | 0.98 | 9.2 | 0.10 | 428 | 388 | 940 | ○ | |
| *4-22 | 1 | 0.07 | 0.01 | 0.01 | 0.98 | 9.3 | 0.14 | 414 | 361 | 1293 | | |
| 4-23 | 1 | 0.02 | 0.01 | 0.005 | 0.98 | 8.8 | 0.20 | 706 | 649 | 802 | ○ | |
| 4-24 | 1 | 0.02 | 0.01 | 0.008 | 0.98 | 8.8 | 0.19 | 686 | 630 | 825 | ○ | |
| 4-25 | 1 | 0.02 | 0.01 | 0.013 | 0.98 | 8.9 | 0.18 | 685 | 653 | 469 | ○ | ○ |
| 4-26 | 1 | 0.02 | 0.01 | 0.015 | 0.98 | 8.9 | 0.18 | 682 | 624 | 859 | ○ | |
| 4-27 | 1 | 0.02 | 0.01 | 0.03 | 0.98 | 9.0 | 0.16 | 663 | 603 | 900 | ○ | |

TABLE 8-continued

| Sample No. | Composition | | | | | Avarage Crystal Grain Size µm | Relative Dielectric Constant (εr) | | Maximum Abusolute Value of Temperature Coefficient of εr | Temperature Dependence Curve of εr | Poralized Charge |
|---|---|---|---|---|---|---|---|---|---|---|---|
| | Ba mole | MgO mole | HoO$_{3/2}$ mole | MnO mole | Ti mole | Yb$_2$O$_3$ parts by mass | 25° C. | 125° C. | 25 to 125° C. ×10$^{-6}$/° C. | ○: Two Peaks observed | ○: 20 nC/cm$^2$ or less |
| *4-28 | 1 | 0.02 | 0.01 | 0.04 | 0.98 | 9.1 | 0.14 | 643 | 572 | 1103 | | |
| 4-29 | 1 | 0.02 | 0.01 | 0.01 | 0.97 | 8.9 | 0.14 | 664 | 646 | 269 | ○ | ○ |
| 4-30 | 1 | 0.02 | 0.01 | 0.01 | 0.99 | 8.9 | 0.15 | 661 | 601 | 903 | ○ | |
| *4-31 | 1 | 0.02 | 0.01 | 0 | 0.98 | 8.8 | 0.40 | 747 | 664 | 1113 | | |
| 4-32 | 1 | 0.02 | 0.03 | 0.01 | 0.98 | 9.0 | 0.05 | 258 | 235 | 889 | ○ | |
| *4-33 | 1 | 0.02 | 0.03 | 0.01 | 0.98 | 9.0 | 0.04 | 203 | 175 | 1381 | | |
| *4-34 | 1 | 0.02 | 0.01 | 0.01 | 0.98 | 8.9 | 0.26 | 1652 | 1305 | 2102 | | |
| 4-35 | 1 | 0.02 | 0.01 | 0.0002 | 0.98 | 8.8 | 0.2 | 714 | 644 | 978 | ○ | |

*Asterisked samples do not fall within the scope of the present invention.

As clear from Table 8, in samples Nos. 4-2 to 4-8, 4-11 to 4-15, 4-18 to 4-21, 4-23 to 4-27, 4-29, 4-30, 4-32 and 4-35, which are fallen in the scope of the present invention, the relative dielectric constant at 25° C. is 257 or more, the relative dielectric constant at 125° C. is 234 or more, and the temperature coefficient in relative dielectric constant in a temperature range from 25° C. to 125° C. is 978×10$^{-6}$/° C. or less as the absolute value.

In particular, in the samples Nos. 4-4 to 4-6, 4-12 to 4-14, 4-19, 4-20, 4-25 and 4-29, the relative dielectric constant at 25° C. is 599 or more, the relative dielectric constant at 125° C. is 572 or more, the temperature coefficient in relative dielectric constant in a temperature range from 25° C. to 125° C. is 476×10$^{-6}$/° C. or less as the absolute value, and the curve indicating the rate of change in relative dielectric constant had two peaks in a temperature range from −55° C. to 125° C. No large hysteresis was observed in the measurements of electric-field versus dielectric polarization characteristic. These samples include, with respect to 1 mole of barium, 0.017 to 0.023 mole of the MgO, Ho equivalent to 0.0015 to 0.01 mole of Ho$_2$O$_3$ and 0.01 to 0.013 mole of the MnO, and the content of the Yb$_2$O$_3$ is 6.3 to 15.6 parts by mass with respect to 100 parts by mass of the barium titanate as a main component. The titanium ratio over 1 mole of barium is 0.97 to 0.98.

Samples having almost no hysteresis had a polarization charge of 40 nC/cm$^2$ or less at 0V. The dielectric ceramic (sample Nos. 4-2 to 4-8, 4-11 to 4-15, 4-18 to 4-21, 4-23 to 4-27, 4-29, 4-30, 4-32 and 4-35) in Example 4 had a crystal structure mainly comprising the cubic system which is similar to X-ray diffraction pattern shown in FIG. 2.

In contrast, in samples Nos. 4-1, 4-9, 4-10, 4-16, 4-17, 4-22, 4-28, 4-31, 4-33 and 4-34, which are out of the scope of the present invention, the absolute values of the temperature coefficient in relative dielectric constant were greater than 1000×10$^{-6}$/° C.

Example 5

Next, among components used in Example 1, the Gd$_2$O$_3$ which is a component as an additive is substituted by Er$_2$O$_3$, but the samples were prepared by the same process of Example 1 and evaluated in the same way (samples Nos. 5-1 to 5-35).

Compositions of powder mixtures, average particle sizes of calcined powders and sintering temperatures are shown in the Tables 9. The average grain sizes of the crystal grains and the characteristics (relative dielectric constant, absolute values of temperature coefficients of relative dielectric constant, temperature change curves in relative dielectric constant and polarized charges) of the sintered samples are shown in Tables 10.

The amounts of the Yb$_2$O$_3$ additive in the Table 9 and the amounts of the Yb$_2$O$_3$ in Table 10 are same as those in Example 1, respectively. In addition, corresponds to a mass ratio relative to 100 parts by mass of barium titanate in the dielectric ceramic (sample). Amounts of the Mg, the rare earth element (RE) and the Mn in Table 9 correspond to converted amounts based on oxide as same in Example 1. "Average grain size of crystal grains" and "the absolute value of temperature coefficient in relative dielectric constant" in Table 8 have the same meaning as Example 1. "○" and no "○" in the "curve of the rate of change in the relative dielectric constant" column and the "polarized charge" column in Table 8 have the same meaning as in Example 10.

TABLE 9

| Sample No. | Composition | | | | | | Average Particle Size of Calcinated Powder µm | Sintering Temperature ° C. |
|---|---|---|---|---|---|---|---|---|
| | Ba mole | MgO mole | ErO$_{3/2}$ mole | MnCO$_3$ mole | Ti mole | Yb$_2$O$_3$ parts by mass | | |
| *5-1 | 1 | 0.02 | 0.01 | 0.01 | 0.98 | 2.0 | 0.1 | 1350 |
| 5-2 | 1 | 0.02 | 0.01 | 0.01 | 0.98 | 3.5 | 0.1 | 1350 |
| 5-3 | 1 | 0.02 | 0.01 | 0.01 | 0.98 | 4.0 | 0.1 | 1350 |
| 5-4 | 1 | 0.02 | 0.01 | 0.01 | 0.98 | 6.0 | 0.1 | 1350 |
| 5-5 | 1 | 0.02 | 0.01 | 0.01 | 0.98 | 8.5 | 0.1 | 1350 |
| 5-6 | 1 | 0.02 | 0.01 | 0.01 | 0.98 | 15.0 | 0.1 | 1350 |
| 5-7 | 1 | 0.02 | 0.01 | 0.01 | 0.98 | 20.0 | 0.1 | 1350 |
| 5-8 | 1 | 0.02 | 0.01 | 0.01 | 0.98 | 50.0 | 0.1 | 1350 |
| *5-9 | 1 | 0.02 | 0.01 | 0.01 | 0.98 | 55.0 | 0.1 | 1350 |

TABLE 9-continued

| Sample No. | Ba mole | MgO mole | ErO$_{3/2}$ mole | MnCO$_3$ mole | Ti mole | Yb$_2$O$_3$ parts by mass | Avarage Particle Size of Calcinated Powder μm | Sintering Temperature °C. |
|---|---|---|---|---|---|---|---|---|
| *5-10 | 1 | 0.02 | 0.0002 | 0.01 | 0.98 | 8.5 | 0.1 | 1350 |
| 5-11 | 1 | 0.02 | 0.0007 | 0.01 | 0.98 | 8.5 | 0.1 | 1350 |
| 5-12 | 1 | 0.02 | 0.0015 | 0.01 | 0.98 | 8.5 | 0.1 | 1350 |
| 5-13 | 1 | 0.02 | 0.005 | 0.01 | 0.98 | 8.5 | 0.1 | 1350 |
| 5-14 | 1 | 0.02 | 0.007 | 0.01 | 0.98 | 8.5 | 0.1 | 1350 |
| 5-15 | 1 | 0.02 | 0.03 | 0.01 | 0.98 | 8.5 | 0.1 | 1350 |
| *5-16 | 1 | 0.02 | 0.04 | 0.01 | 0.98 | 8.5 | 0.1 | 1350 |
| *5-17 | 1 | 0.005 | 0.01 | 0.01 | 0.98 | 8.5 | 0.1 | 1350 |
| 5-18 | 1 | 0.01 | 0.01 | 0.01 | 0.98 | 8.5 | 0.1 | 1350 |
| 5-19 | 1 | 0.017 | 0.01 | 0.01 | 0.98 | 8.5 | 0.1 | 1350 |
| 5-20 | 1 | 0.023 | 0.01 | 0.01 | 0.98 | 8.5 | 0.1 | 1350 |
| 5-21 | 1 | 0.06 | 0.01 | 0.01 | 0.98 | 8.5 | 0.1 | 1350 |
| *5-22 | 1 | 0.07 | 0.01 | 0.01 | 0.98 | 8.5 | 0.1 | 1350 |
| 5-23 | 1 | 0.02 | 0.01 | 0.005 | 0.98 | 8.5 | 0.1 | 1350 |
| 5-24 | 1 | 0.02 | 0.01 | 0.008 | 0.98 | 8.5 | 0.1 | 1350 |
| 5-25 | 1 | 0.02 | 0.01 | 0.013 | 0.98 | 8.5 | 0.1 | 1350 |
| 5-26 | 1 | 0.02 | 0.01 | 0.015 | 0.98 | 8.5 | 0.1 | 1350 |
| 5-27 | 1 | 0.02 | 0.01 | 0.03 | 0.98 | 8.5 | 0.1 | 1350 |
| *5-28 | 1 | 0.02 | 0.01 | 0.04 | 0.98 | 8.5 | 0.1 | 1350 |
| 5-29 | 1 | 0.02 | 0.01 | 0.01 | 0.97 | 8.5 | 0.1 | 1350 |
| 5-30 | 1 | 0.02 | 0.01 | 0.01 | 0.99 | 8.5 | 0.1 | 1350 |
| *5-31 | 1 | 0.02 | 0.01 | 0 | 0.98 | 8.5 | 0.1 | 1350 |
| 5-32 | 1 | 0.02 | 0.03 | 0.01 | 0.98 | 8.5 | 0.04 | 1350 |
| *5-33 | 1 | 0.02 | 0.03 | 0.01 | 0.98 | 8.5 | 0.04 | 1320 |
| *5-34 | 1 | 0.02 | 0.01 | 0.01 | 0.98 | 8.5 | 0.1 | 1380 |
| 5-35 | 1 | 0.02 | 0.01 | 0.0002 | 0.98 | 8.5 | 0.1 | 1350 |

*Asterisked samples do not fall within the scope of the present invention.

TABLE 10

| | Composition | | | | | Avarage Yb$_2$O$_3$ | Crystal Grain | Relative Dielectric Constant (εr) | | Maximum Abusolute Value of Temperature Coefficient of εr | Temperature Dependence Curve of εr | Poralized Charge |
|---|---|---|---|---|---|---|---|---|---|---|---|---|
| Sample No. | Ba mole | MgO mole | ErO$_{3/2}$ mole | MnO mole | Ti mole | parts by mass | Size μm | 25° C. | 125° C. | 25 to 125° C. ×10$^{-6}$/° C. | ○: Two Peaks observed | ○: 20 nC/cm$^2$ or less |
| *5-1 | 1 | 0.02 | 0.01 | 0.01 | 0.98 | 2.1 | 0.40 | 2596 | 1524 | 4127 | | |
| 5-2 | 1 | 0.02 | 0.01 | 0.01 | 0.98 | 3.6 | 0.20 | 1082 | 978 | 953 | ○ | |
| 5-3 | 1 | 0.02 | 0.01 | 0.01 | 0.98 | 4.2 | 0.18 | 845 | 771 | 867 | ○ | |
| 5-4 | 1 | 0.02 | 0.01 | 0.01 | 0.98 | 6.3 | 0.17 | 700 | 677 | 340 | ○ | ○ |
| 5-5 | 1 | 0.02 | 0.01 | 0.01 | 0.98 | 8.9 | 0.15 | 670 | 645 | 371 | ○ | ○ |
| 5-6 | 1 | 0.02 | 0.01 | 0.01 | 0.98 | 15.6 | 0.15 | 649 | 623 | 398 | ○ | ○ |
| 5-7 | 1 | 0.02 | 0.01 | 0.01 | 0.98 | 20.8 | 0.15 | 639 | 597 | 647 | ○ | |
| 5-8 | 1 | 0.02 | 0.01 | 0.01 | 0.98 | 52.1 | 0.15 | 260 | 237 | 877 | ○ | |
| *5-9 | 1 | 0.02 | 0.01 | 0.01 | 0.98 | 57.3 | 0.15 | 185 | 166 | 1061 | | |
| *5-10 | 1 | 0.02 | 0.0002 | 0.01 | 0.98 | 8.8 | 0.40 | 824 | 700 | 1501 | | |
| 5-11 | 1 | 0.02 | 0.0007 | 0.01 | 0.98 | 8.8 | 0.20 | 742 | 680 | 835 | ○ | |
| 5-12 | 1 | 0.02 | 0.0015 | 0.01 | 0.98 | 8.8 | 0.18 | 703 | 670 | 470 | ○ | ○ |
| 5-13 | 1 | 0.02 | 0.005 | 0.01 | 0.98 | 8.8 | 0.17 | 695 | 664 | 446 | ○ | ○ |
| 5-14 | 1 | 0.02 | 0.007 | 0.01 | 0.98 | 8.8 | 0.17 | 673 | 653 | 292 | ○ | ○ |
| 5-15 | 1 | 0.02 | 0.03 | 0.01 | 0.98 | 9.0 | 0.10 | 698 | 651 | 680 | ○ | |
| *5-16 | 1 | 0.02 | 0.04 | 0.01 | 0.98 | 9.1 | 0.10 | 710 | 628 | 1148 | | |
| *5-17 | 1 | 0.005 | 0.01 | 0.01 | 0.98 | 8.7 | 0.40 | 824 | 721 | 1251 | | |
| 5-18 | 1 | 0.01 | 0.01 | 0.01 | 0.98 | 8.8 | 0.20 | 649 | 597 | 795 | ○ | |
| 5-19 | 1 | 0.017 | 0.01 | 0.01 | 0.98 | 8.8 | 0.16 | 618 | 595 | 368 | ○ | ○ |
| 5-20 | 1 | 0.023 | 0.01 | 0.01 | 0.98 | 8.9 | 0.15 | 605 | 578 | 445 | ○ | ○ |
| 5-21 | 1 | 0.06 | 0.01 | 0.01 | 0.98 | 9.2 | 0.10 | 433 | 392 | 931 | ○ | |
| *5-22 | 1 | 0.07 | 0.01 | 0.01 | 0.98 | 9.3 | 0.14 | 418 | 365 | 1283 | | |
| 5-23 | 1 | 0.02 | 0.01 | 0.005 | 0.98 | 8.8 | 0.20 | 713 | 656 | 796 | ○ | |
| 5-24 | 1 | 0.02 | 0.01 | 0.008 | 0.98 | 8.8 | 0.19 | 693 | 636 | 819 | ○ | |
| 5-25 | 1 | 0.02 | 0.01 | 0.013 | 0.98 | 8.9 | 0.18 | 692 | 660 | 463 | ○ | ○ |
| 5-26 | 1 | 0.02 | 0.01 | 0.015 | 0.98 | 8.9 | 0.18 | 689 | 630 | 853 | ○ | |
| 5-27 | 1 | 0.02 | 0.01 | 0.03 | 0.98 | 9.0 | 0.16 | 670 | 610 | 894 | ○ | |
| *5-28 | 1 | 0.02 | 0.01 | 0.04 | 0.98 | 9.1 | 0.14 | 649 | 578 | 1097 | | |
| 5-29 | 1 | 0.02 | 0.01 | 0.01 | 0.97 | 8.9 | 0.14 | 671 | 653 | 263 | ○ | ○ |
| 5-30 | 1 | 0.02 | 0.01 | 0.01 | 0.99 | 8.9 | 0.15 | 667 | 608 | 897 | ○ | |

TABLE 10-continued

| | Composition | | | | | | Avarage Crystal Grain | Relative Dielectric Constant (εr) | | Maximum Abusolute Valure of Temperature Coefficient of εr | Temperature Dependence Curve of εr | Poralized Charge |
|---|---|---|---|---|---|---|---|---|---|---|---|---|
| | | | | | | Yb$_2$O$_3$ | | | | | | |
| Sample No. | Ba mole | MgO mole | ErO$_{3/2}$ mole | MnO mole | Ti mole | parts by mass | Size μm | 25° C. | 125° C. | 25 to 125° C. ×10$^{-6}$/° C. | ○: Two Peaks observed | ○: 20 nC/cm$^2$ or less |
| *5-31 | 1 | 0.02 | 0.01 | 0 | 0.98 | 8.8 | 0.40 | 754 | 670 | 1108 | | |
| 5-32 | 1 | 0.02 | 0.03 | 0.01 | 0.98 | 9.0 | 0.05 | 261 | 238 | 873 | ○ | |
| *5-33 | 1 | 0.02 | 0.03 | 0.01 | 0.98 | 9.0 | 0.04 | 205 | 177 | 1362 | | |
| *5-34 | 1 | 0.02 | 0.01 | 0.01 | 0.98 | 8.9 | 0.26 | 1669 | 1318 | 2099 | | |
| 5-35 | 1 | 0.02 | 0.01 | 0.0002 | 0.98 | 8.8 | 0.2 | 721 | 651 | 973 | | ○ |

*Asterisked samples do not fall within the scope of the present invention.

As clear from Table 10, in samples Nos. 5-2 to 5-8, 5-11 to 5-15, 5-18 to 5-21, 5-23 to 5-27, 5-29, 5-30, 5-32 and 5-35, which are fallen in the scope of the present invention, the relative dielectric constant at 25° C. is 260 or more, the relative dielectric constant at 125° C. is 237 or more, and the temperature coefficient in relative dielectric constant in a temperature range from 25° C. to 125° C. is 973×10$^{-6}$/° C. or less as the absolute value.

In particular, in the samples Nos. 5-4 to 5-6, 5-12 to 5-14, 5-19, 5-20, 5-25 and 5-29, the relative dielectric constant at 25° C. is 605 or more, the relative dielectric constant at 125° C. is 578 or more, the temperature coefficient in relative dielectric constant in a temperature range from 25° C. to 125° C. is 470×10$^{-6}$/° C. or less as the absolute value, and the curve indicating the rate of change in relative dielectric constant had two peaks in a temperature range from −55° C. to 125° C. No large hysteresis was observed in the measurements of electric-field versus dielectric polarization characteristic. These samples include, with respect to 1 mole of barium, 0.017 to 0.023 mole of the MgO, Er equivalent to 0.0015 to 0.01 mole of Er$_2$O$_3$ and 0.01 to 0.013 mole of the MnO, and the content of the Yb$_2$O$_3$ is 6.3 to 15.6 parts by mass with respect to 100 parts by mass of the barium titanate as a main component. The titanium ratio over 1 mole of barium is 0.97 to 0.98.

Samples having almost no hysteresis had a polarization charge of 40 nC/cm$^2$ or less at 0V. The dielectric ceramic (sample Nos. 5-2 to 5-8, 5-11 to 5-15, 5-18 to 5-21, 5-23 to 5-27, 5-29, 5-30, 5-32 and 5-35) in Example 5 had a crystal structure mainly comprising the cubic system which is similar to X-ray diffraction pattern shown in FIG. 2.

In addition, in sample No. 5-4, a dielectric ceramic with a half of the amount of Er$_2$O$_3$ substituted by Ho$_2$O$_3$ and sintered at the same temperature had similar results of the grain size of crystal grains, and relative dielectric constants at 25° C. and at 125° C. to the sample No. 5-4. Also, the curve of the rate of change in relative dielectric constant had two peaks and the dielectric polarization was 40 nC/cm$^2$ or less.

In contrast, in samples Nos. 5-1, 5-9, 5-10, 5-16, 5-17, 5-22, 5-28, 5-31, 5-33 and 5-34, which are out of the scope of the present invention, the absolute values of the temperature coefficient in relative dielectric constant were greater than 1000×10$^{-6}$/° C.

The invention claimed is:

1. A dielectric ceramic, comprising:
   crystal grains containing barium titanate as a main crystal component; and
   a grain boundary phase formed between or among the crystal grains, wherein
   with respect to one mole of barium constituting the barium titanate, the dielectric ceramic contains:
   magnesium equivalent to 0.01 to 0.06 mole of MgO;
   rare earth element (RE) equivalent to 0.0007 to 0.03 mole of REO$_{3/2}$ where rare earth element comprises at least one element selected from gadolinium, terbium, dysprosium, holmium and erbium; and
   manganese equivalent to 0.0002 to 0.03 mole of MnO,
   with respect to 100 parts by mass of barium titanate, the dielectric ceramic further contains:
   ytterbium equivalent to 3.6 to 52.1 parts by mass of Yb$_2$O$_3$, and
   the average grain size of the crystal grains is 0.05 μm to 0.2 μm.

2. The dielectric ceramic according to claim 1, wherein with respect to one mole of barium constituting the barium titanate,
   the magnesium is equivalent to 0.017 to 0.023 mole of MgO;
   the rare earth element (RE) is equivalent to 0.0015 to 0.01 mole of REO$_{3/2}$; and
   the manganese is equivalent to 0.01 to 0.013 mole of MnO, with respect to 100 parts by mass of barium titanate,
   ytterbium is equivalent to 6.3 to 15.6 parts by mass of Yb$_2$O$_3$, and
   a titanium ratio over 1 mole of barium constituting the barium titanate is 0.97 to 0.98.

3. A capacitor, comprising a laminated body, the laminated body comprising:
   dielectric layers consisting of the dielectric ceramic according to claim 1; and
   conductive layers.

4. A capacitor, comprising a laminated body, the laminated body comprising:
   dielectric layers consisting of the dielectric ceramic according to claim 2; and
   conductive layers.

* * * * *